(12) United States Patent
Boundy et al.

(10) Patent No.: US 12,297,875 B2
(45) Date of Patent: May 13, 2025

(54) SHEAR THICKENING FLUID BASED ROTARY POWER SHUNT MECHANISM

(71) Applicant: Moshun, LLC, Oak Brook, IL (US)

(72) Inventors: Timothy John Boundy, Deer Park, IL (US); Steven Michael Barger, Bartlett, IL (US); Terence Michael Lydon, Westmont, IL (US); Richard Michael Lang, Howey In The Hills, FL (US); Wilfredo Gonzalez, Jr., Plainfield, IL (US); Darren Michael Boundy, Long Grove, IL (US); Eric McHugh, Naperville, IL (US); David Schuda, Wheaton, IL (US); George L. Wilson, IV, Kalamazoo, MI (US); Gary W. Grube, Barrington Hills, IL (US); Jason K. Resch, Warwick, RI (US); Mario F. DeRango, Cary, IL (US); John Edward Buchalo, South Barrington, IL (US); Richard A. Herbst, Clarendon Hills, IL (US); Kurt Estes, Lake Zurich, IL (US); Evan Anderson, Naples, FL (US)

(73) Assignee: Moshun, LLC, Oak Brook, IL (US)

( * ) Notice: Subject to any disclaimer, the term of this patent is extended or adjusted under 35 U.S.C. 154(b) by 381 days.

(21) Appl. No.: 17/703,253

(22) Filed: Mar. 24, 2022

(65) Prior Publication Data
US 2023/0296149 A1 Sep. 21, 2023

Related U.S. Application Data

(60) Provisional application No. 63/321,871, filed on Mar. 21, 2022.

(51) Int. Cl.
*F16D 33/02* (2006.01)
*F16D 3/80* (2006.01)
(Continued)

(52) U.S. Cl.
CPC ............... *F16D 33/02* (2013.01); *F16D 3/80* (2013.01); *F16D 33/20* (2013.01); *F16D 57/005* (2013.01); *F16D 2300/08* (2013.01)

(58) Field of Classification Search
CPC . F16D 33/02; F16D 3/80; F16D 33/20; F16D 57/005; F16D 2300/08
(Continued)

(56) References Cited

U.S. PATENT DOCUMENTS

| | | |
|---|---|---|
| 1,704,217 A | 3/1929 | Rosenthal |
| 1,736,175 A | 11/1929 | Rosenthal |

(Continued)

FOREIGN PATENT DOCUMENTS

| | | |
|---|---|---|
| DE | 202006006422 U1 | 8/2006 |
| DE | 202006011846 U1 | 12/2007 |

(Continued)

*Primary Examiner* — Greg Binda
(74) *Attorney, Agent, or Firm* — Gary W. Grube

(57) ABSTRACT

A power shunt for shunting rotary power from a load device includes a shear thickening fluid (STF) and a chamber that contains the STF. The power shunt further includes a drive shaft housed radially within a drive side section of the chamber and protruding outward from an end of the chamber for coupling to a lock configured to prevent rotation of the drive shaft. The power shunt further includes a load shaft housed radially within a load side section of the chamber and protruding outward from another end of the chamber for coupling to the load device. The power shunt further includes a drive turbine housed radially within the drive side section and coupled to the drive shaft. The power shunt further includes a load turbine housed radially within the load side section at a fixed operational distance from the drive turbine and coupled to the load shaft.

6 Claims, 18 Drawing Sheets

(51) Int. Cl.
*F16D 33/20* (2006.01)
*F16D 57/00* (2006.01)

(58) Field of Classification Search
USPC .......................................... 464/2, 24; 60/330
See application file for complete search history.

(56) References Cited

U.S. PATENT DOCUMENTS

| | | | |
|---|---|---|---|
| 1,965,806 A | 7/1934 | Riggins | |
| 2,740,308 A | 4/1956 | Blanchard | |
| 3,209,874 A * | 10/1965 | Foster | F16D 35/00 |
| | | | 60/330 |
| 3,284,841 A | 11/1966 | Patriquin | |
| 3,487,494 A | 1/1970 | De Baan | |
| 3,489,087 A | 1/1970 | Soderberg | |
| 3,979,790 A | 9/1976 | Chiarappa | |
| 4,452,437 A | 6/1984 | Lochner | |
| 4,590,639 A | 5/1986 | Fritsche | |
| 5,078,552 A | 1/1992 | Albel | |
| 5,924,714 A | 7/1999 | Farris | |
| 7,628,257 B1 | 12/2009 | Lu | |
| 7,825,045 B1 | 11/2010 | Wagner | |
| 7,918,167 B2 | 4/2011 | Tanielian et al. | |
| 8,276,497 B2 | 10/2012 | Hunn | |
| 8,499,908 B2 | 8/2013 | Barker et al. | |
| 8,943,652 B2 | 2/2015 | Bacchetti | |
| 9,303,709 B2 | 4/2016 | Manes | |
| 9,453,550 B2 | 9/2016 | Smith et al. | |
| 9,498,690 B2 | 11/2016 | Carlson et al. | |
| 9,970,831 B2 | 5/2018 | Shih | |
| 10,017,082 B2 | 7/2018 | Zwaan | |
| 10,161,173 B2 | 12/2018 | Kruedener et al. | |
| 10,371,097 B2 | 8/2019 | Sellinger et al. | |
| 10,443,678 B2 | 10/2019 | Galindo Rosales et al. | |
| 10,462,578 B2 | 10/2019 | Hoskins et al. | |
| 10,480,281 B2 | 11/2019 | Al-Olayan et al. | |
| 10,580,231 B2 | 3/2020 | Lin | |
| 10,633,905 B2 | 4/2020 | Feng | |
| 10,920,474 B2 | 2/2021 | Shinmura | |
| 2002/0010977 A1 | 1/2002 | Salice | |
| 2003/0155196 A1 | 8/2003 | Nishiyama | |
| 2003/0213663 A1 | 11/2003 | Salice | |
| 2004/0068833 A1 | 4/2004 | Sawa | |
| 2005/0034269 A1 | 2/2005 | Jinbo | |
| 2009/0119873 A1 | 5/2009 | Bassi | |
| 2009/0241287 A1 | 10/2009 | Reid | |
| 2010/0162521 A1 | 7/2010 | Pyo | |
| 2010/0170062 A1 | 7/2010 | Kim | |
| 2010/0287729 A1 | 11/2010 | Jin | |
| 2010/0319260 A1 | 12/2010 | Sawa | |
| 2013/0097805 A1 | 4/2013 | Bland | |
| 2014/0352111 A1 | 12/2014 | Ng | |
| 2015/0040998 A1 | 2/2015 | Gilstad | |
| 2016/0215552 A1 | 7/2016 | Lohken et al. | |
| 2017/0096850 A1 | 4/2017 | Hopkins | |
| 2017/0210458 A1 | 7/2017 | Tothill et al. | |
| 2017/0226682 A1 | 8/2017 | Duckworth | |
| 2017/0304057 A1 | 10/2017 | Bichler | |
| 2018/0266512 A1 | 9/2018 | Zimmer | |
| 2019/0040667 A1 | 2/2019 | Feng | |
| 2019/0128362 A1 | 5/2019 | Naserimojarad | |
| 2019/0371090 A1 | 12/2019 | Lin et al. | |
| 2020/0011110 A1 | 1/2020 | Boundy | |
| 2020/0240190 A1 | 7/2020 | Held | |
| 2022/0220788 A1 | 7/2022 | Boundy | |
| 2022/0221019 A1 | 7/2022 | Boundy | |
| 2022/0221020 A1 | 7/2022 | Boundy | |
| 2023/0296142 A1 * | 9/2023 | Boundy | F16D 33/02 |
| | | | 464/24 |

FOREIGN PATENT DOCUMENTS

| | | |
|---|---|---|
| DE | 102008014329 A1 | 9/2009 |
| EP | 0063635 B1 | 2/1985 |
| JP | 2003266222 A | 9/2003 |
| JP | 2004353712 A | 12/2004 |
| JP | 2009531631 A | 9/2009 |
| JP | 2014118303 A | 6/2014 |
| KR | 2020040018600 | 6/2006 |
| WO | 2007116273 A1 | 10/2007 |
| WO | 2020103458 A1 | 5/2020 |

* cited by examiner

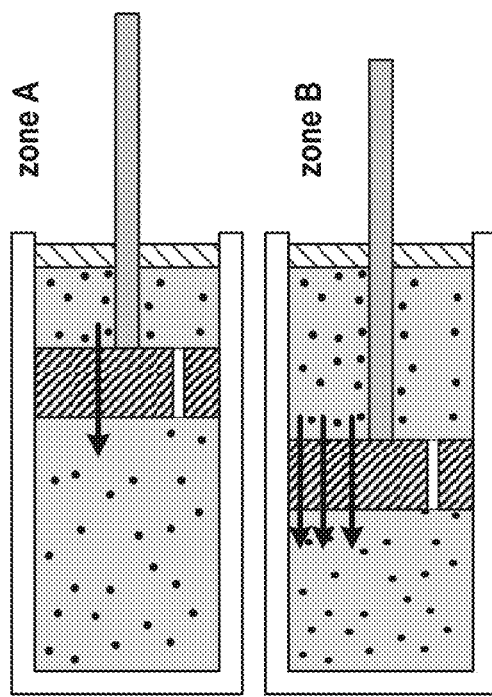
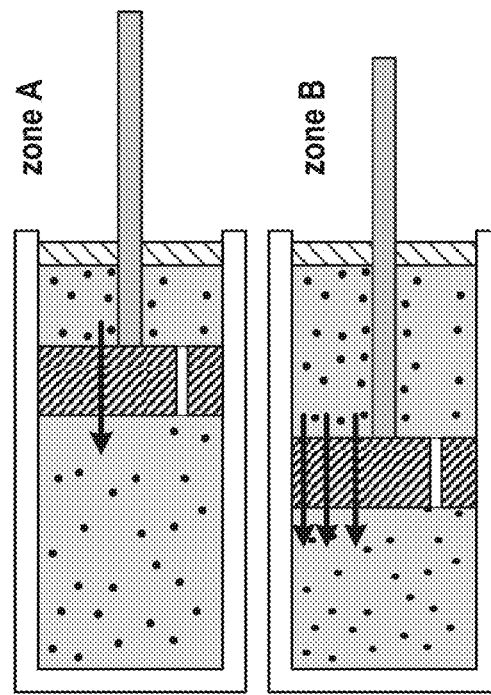
FIG. 1B
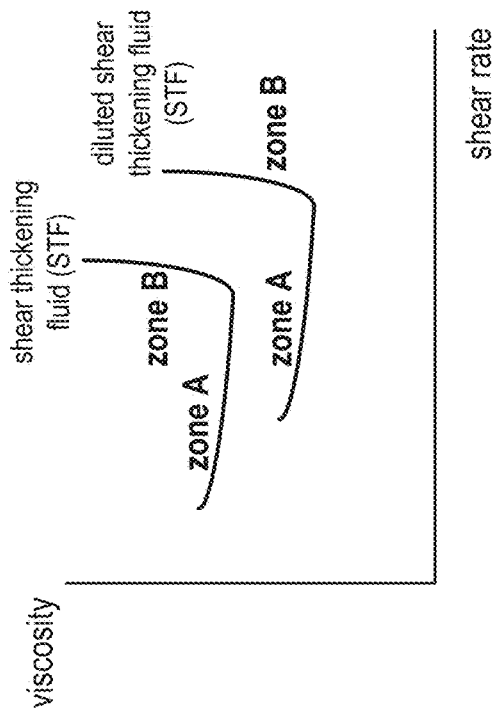
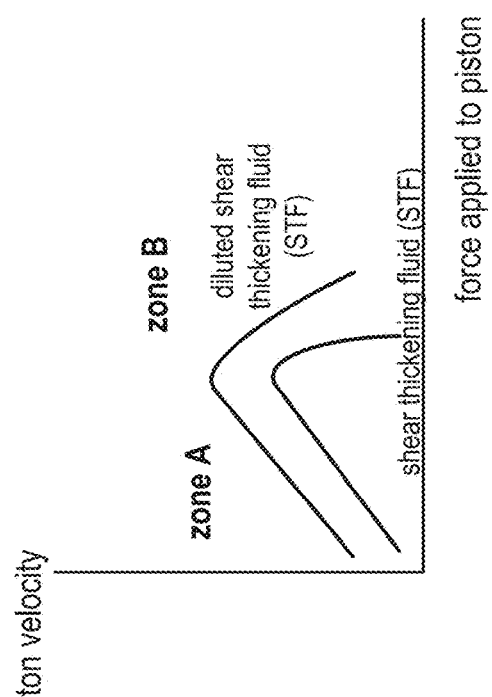
FIG. 1C

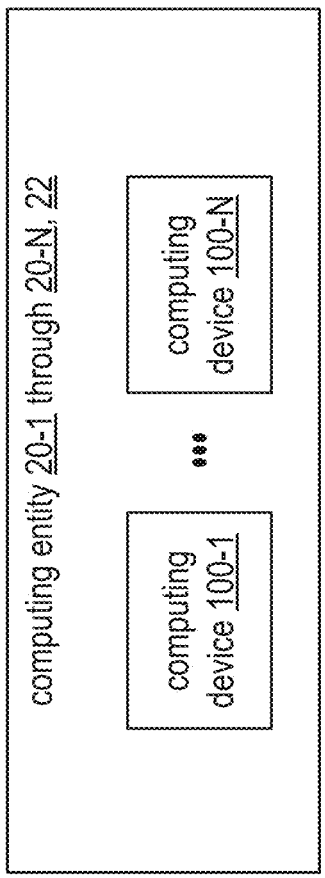
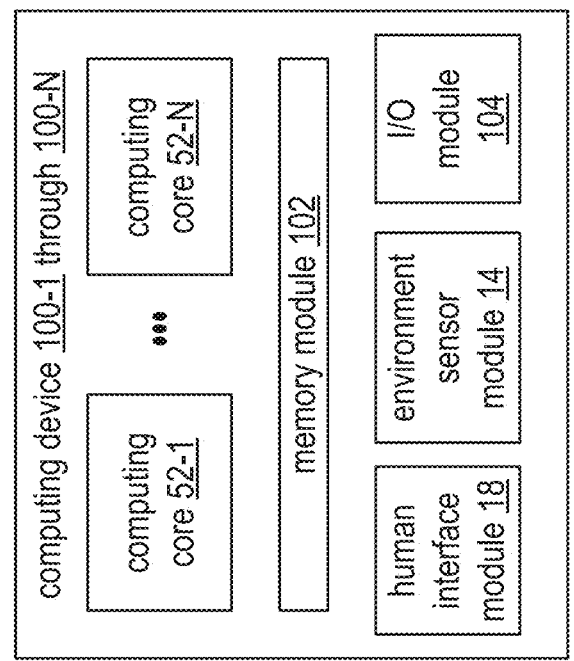

SHEAR THICKENING FLUID BASED ROTARY POWER SHUNT MECHANISM

CROSS-REFERENCE TO RELATED APPLICATIONS

The present U.S. Utility Patent application claims priority pursuant to 35 U.S.C. § 119(e) to U.S. Provisional Application No. 63/321,871, entitled "SHEAR THICKENING FLUID BASED ROTARY POWER COUPLER AND SHUNT MECHANISM", filed Mar. 21, 2022, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to systems that measure and control mechanical movement and more particularly to sensing and controlling of a linear and/or rotary movement mechanism that includes a chamber with dilatant fluid (e.g., a shear thickening fluid).

Description of Related Art

Many mechanical mechanisms are subject to undesired movement that can lead to annoying sounds, property damage and/or loss, and personal injury and even death. Desired and undesired movements of the mechanical mechanisms may involve a wide range of forces. A need exists to control the wide range of forces to solve these problems.

BRIEF DESCRIPTION OF THE SEVERAL VIEWS OF THE DRAWING(S)

FIG. 1B is a graph of viscosity vs. shear rate for an aspect of an embodiment of a mechanical and computing system in accordance with the present invention;

FIG. 1C is a graph of plunger velocity vs. force applied to the plunger for an aspect of an embodiment of a mechanical and computing system in accordance with the present invention;

FIG. 2A is a schematic block diagram of an embodiment of a computing entity of a computing system in accordance with the present invention;

FIG. 2B is a schematic block diagram of an embodiment of a computing device of a computing system in accordance with the present invention;

DETAILED DESCRIPTION OF THE INVENTION

Figure 1A:
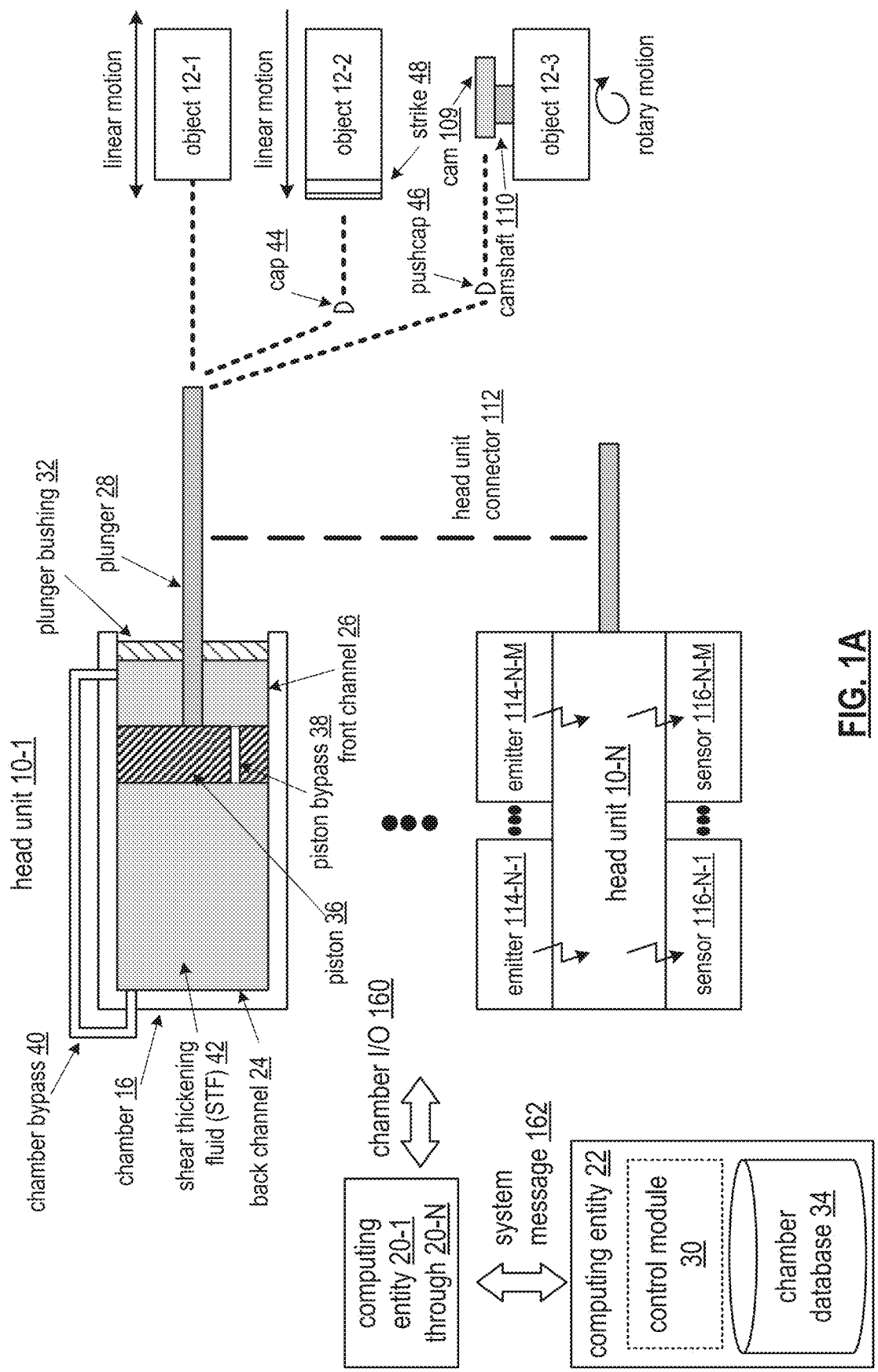
FIG. 1A is a schematic block diagram of an embodiment of a mechanical and computing system in accordance with the present invention.

FIG. 1A is a schematic block diagram of an embodiment of a mechanical and computing system that includes a set of head units 10-1 through 10-N, objects 12-1 through 12-3, computing entities 20-1 through 20-N associated with the head units 10-1 through 10-N, and a computing entity 22. The objects include any object that has mass and moves. Examples of an object include a door, an aircraft wing, a portion of a building support mechanism, and a particular drivetrain, etc.

The cross-sectional view of FIG. 1A illustrates a head unit that includes a chamber 16, a piston 36, a plunger 28, a plunger bushing 32, and a chamber bypass 40. The chamber 16 contains a shear thickening fluid (STF) 42. The chamber 16 includes a back channel 24 and a front channel 26, where the piston partitions the back channel 24 and the front channel 26. The piston 36 travels axially within the chamber 16. The chamber 16 may be a cylinder or any other shape that enables movement of the piston 36 and compression of the STF 42. The STF 42 is discussed in greater detail with reference to FIGS. 1B and 1C.

The plunger bushing 32 guides the plunger 28 into the chamber 16 in response to force from the object 12-1. The plunger bushing 32 facilitates containment of the STF within the chamber 16. The plunger bushing 32 remains in a fixed position relative to the chamber 16 when the force from the object moves the piston 36 within the chamber 16. In an embodiment the plunger bushing 32 includes an O-ring between the plunger bushing 32 and the chamber 16. In another embodiment the plunger bushing 32 includes an O-ring between the plunger bushing 32 and the plunger 28.

The piston 36 includes a piston bypass 38 between opposite sides of the piston to facilitate flow of a portion of the STF between the opposite sides of the piston (e.g., between the back channel 24 and the front channel 26) when the piston travels through the chamber in an inward or an outward direction.

Alternatively, or in addition to, the chamber bypass 40 is configured between opposite ends of the chamber 16, wherein the chamber bypass 40 facilitates flow of a portion of the STF between the opposite ends of the chamber when the piston travels through the chamber in the inward or outward direction (e.g., between the back channel 24 and the front channel 26).

In alternative embodiments, the piston bypass 38 and the chamber bypass 40 includes mechanisms to enable STF flow in one direction and not an opposite direction. In further alternative embodiments, a control valve within the piston bypass 38 and/or the chamber bypass controls the STF flow between the back channel 24 and the front channel 26. Each bypass includes one or more of a one-way check valve and a variable flow valve.

The plunger 28 is operably coupled to a corresponding object by one of a variety of approaches. A first approach includes a direct connection of the plunger 28 to the object 12-1 such that linear motion in any direction couples from the object 12-1 to the plunger 28. A second approach includes the plunger 28 coupled to a cap 44 which receives a one way force from a strike 48 attached to the object 12-2. A third approach includes a pushcap 46 that receives a force from a rotary-to-linear motion conversion component that is attached to the object 12-3. In an example, the object 12-3 is connected to a camshaft 110 which turns a cam 109 to strike the pushcap 46.

In an embodiment, two or more of the head units are coupled by a head unit connector 112. When so connected, actuation of a piston in a first head unit is essentially replicated in a piston of a second head unit. The head unit connector 112 includes a mechanical element between plungers of the two or more head units and/or direct connection of two or more plungers to a common object. For example, plunger 28 of head unit 10-1 and plunger 28 of head unit 10-2 are directly connected to object 12-1 when utilizing a direct connection.

Further associated with each head unit is a set of emitters and a set of sensors. For example, head unit 10-N includes a set of emitters 114-N-1 through 114-N-M and a set of sensors 116-N-1 through 116-N-M. Emitters includes any type of energy and or field emitting device to affect the STF, either directly or indirectly via other nanoparticles suspended in the STF. Examples of emitter categories include light, audio, electric field, magnetic field, wireless field, etc. Specific examples of fluid manipulation emitters include a variable flow valve associated with a bypass or injector or similar, a mechanical vibration generator, an image generator, a light emitter, an audio transducer, a speaker, an ultrasonic sound transducer, an electric field generator, a magnetic field generator, and a radio frequency wireless field transmitter. Specific examples of magnetic field emitters include a Helmholtz coil, a Maxwell coil, a permanent magnet, a solenoid, a superconducting electromagnet, and a radio frequency transmitting coil.

Sensors include any type of energy and/or field sensing device to output a signal that represents a reaction, motion or position of the STF. Examples of sensor categories include bypass valve position, mechanical position, image, light, audio, electric field, magnetic field, wireless field, etc. Specific examples of fluid flow sensors include a valve opening detector associated with the chamber 16 or any type of bypass (e.g., piston bypass 38, chamber bypass 40, a reservoir injector, or similar), a mechanical position sensor, an image sensor, a light sensor, an audio sensor, a microphone, an ultrasonic sound sensor, an electric field sensor, a magnetic field sensor, and a radio frequency wireless field sensor. Specific examples of magnetic field sensors include a Hall effect sensor, a magnetic coil, a rotating coil magnetometer, an inductive pickup coil, an optical magnetometry sensor, a nuclear magnetic resonance sensor, and a caesium vapor magnetometer.

The computing entities 20-1 through 20-N are discussed in detail with reference to FIG. 2A. The computing entity 22 includes a control module 30 and a chamber database 34 to facilitate storage of history of operation, desired operations, and other aspects of the system.

In an example of operation, the head unit 10-1 controls motion of the object 12-1 and includes the chamber 16 filled at least in part with the shear thickening fluid 42, the piston 36 housed at least partially radially within the chamber 16, and the piston 36 is configured to exert pressure against the shear thickening fluid 42 in response to movement of the piston 36 from a force applied to the piston from the object 12-1. The movement of the piston 36 includes one of traveling through the chamber 16 in an inward direction or traveling through the chamber 16 in an outward direction. The STF is configured to have a decreasing viscosity in response to a first range of shear rates and an increasing viscosity in response to a second range of shear rates.

The shear thickening fluid 42 (e.g., dilatant non-Newtonian fluid) has nanoparticles of a specific dimension that are mixed in a carrier fluid or solvent. Force applied to the shear thickening fluid 42 results in these nanoparticles stacking up, thus stiffening and acting more like a solid than a flowable liquid when a shear threshold is reached. In particular, viscosity of the shear thickening fluid 42 rises significantly when shear rate is increased to a point of the shear threshold. The relationship between viscosity and shear rates is discussed in greater detail with reference to FIGS. 1A and 1B.

In another example of operation, the object 12-1 applies an inward motion force on the plunger 28 which moves the piston 36 in words within the chamber 16. As the piston moves inward, shear rate of the shear thickening fluid 42 changes. A sensor 116-1-1 associated with the chamber 16 of the head unit 10-1 outputs chamber I/O 160 to the computing entity 20-1, where the chamber I/O 160 includes a movement data associated with the STF 42 as a result of the piston 36 moving inwards. Having received the chamber I/O 160, the computing entity 20-1 interprets the chamber I/O 160 to reproduce the movement data.

The computing entity 20-1 outputs the movement data as a system message 162 to the computing entity 22. The control module 30 stores the movement data in the chamber database 34 and interprets the movement data to determine whether to dynamically adjust the viscosity of the shear thickening fluid. Dynamic adjustment of the viscosity results in dynamic control of the movement of the piston 36, the plunger 28, and ultimately the object 12-1. Adjustment of the viscosity affects velocity, acceleration, and position of the piston 36.

The control module 30 determines whether to adjust the viscosity based on one or more desired controls of the object 12-1. The desired controls include accelerating, deaccelerating, abruptly stopping, continuing on a current trajectory, continuing at a constant velocity, or any other movement control. For example, the control module 30 determines to abruptly stop the movement of the object 12-1 when the object 12-1 is a door and the door is detected to be closing at a rate above a maximum closing rate threshold level and when the expected shear rate versus viscosity of the shear thickening fluid 42 requires modification (e.g., boost the viscosity now to slow the door from closing too quickly).

When determining to modify the viscosity, the control module 30 outputs a system message 162 to the computing entity 20-1, where the system message 162 includes instructions to immediately boost the viscosity beyond the expected shear rate versus viscosity of the shear thickening fluid 42. Alternatively, the system message 162 includes specific information on the relationship of viscosity versus shear rate.

Having received the system message 162, the computing entity 20-1 determines a set of adjustments to make with regards to the shear thickening fluid 42 within the chamber 16. The set of adjustments includes one or more of adjusting STF 42 flow through the chamber bypass 40, adjusting STF 42 flow through the piston bypass 38, and activating an emitter of a set of emitters 114-1-1 through 114-N-1. The flow adjustments include regulating within a flow range, stopping, starting, and allowing in one particular direction. For example, the computing entity 20-1 determines to activate emitter 114-1-1 to produce a magnetic field such as to interact with magnetic nanoparticles within the STF 42 to raise the viscosity. The computing entity 20-1 issues another chamber I/O 160 to the emitter 114-1-1 to initiate a magnetic influence process to boost the viscosity of the STF 42.

In an alternative embodiment, the computing entity 22 issues another system message 162 to two or more computing entities (e.g., 20-1 and 20-2) to boost the viscosity for corresponding head units 10-1 and 10-2 when the head unit connector 112 connects head units 10-1 and 10-2 and both head units are controlling the motion of the object 12-1. For instance, one of the head units informs the computing entity 22 that the object 12-1 is moving too quickly inward and the predicted stopping power of the expected viscosity versus shear rate of the STF 42 of the head unit, even when boosted, will not be enough to slow the object 12-1 to a desired velocity or position. When informed that one head unit, even with a modified viscosity, is not enough to control the object 12-1, the control module 30 determines how many other head units (e.g., connected via the head unit connector 112) to apply and to dynamically modify the viscosity.

In yet another alternative embodiment, the computing entity 22 issues a series of system messages 162 to a set of computing entities associated with a corresponding set of head units to produce a cascading effect of altering of the viscosity of the STF 42 of each of the chambers 16 associated with the set of head units. For example, 3 head units are controlled by 3 corresponding computing entities to adjust viscosity in a time cascaded manner. For instance, head unit 10-1 abruptly changes the viscosity to attempt to slow the object 12-1 followed seconds later by head unit 10-2 abruptly changing the viscosity to attempt to further slow the object 12-1, followed seconds later by head unit 12-3 abruptly changing the viscosity to attempt to further slow the object 12-1.

In a still further alternative embodiment, the computing entity 22 conditionally issues each message of the series of system messages 162 to the set of computing entities associated with the corresponding set of head units to produce the cascading effect of altering of the viscosity of the STF 42 of each of the chambers 16 associated with the set of head units only when a most recent adaptation of viscosity is not enough to slow the object 12-1 with desired results. For example, the 3 head units are controlled by the 3 corresponding computing entities to adjust viscosity in a conditional time cascaded manner. For instance, head unit 10-1 abruptly changes the viscosity to attempt to slow the object 12-1 followed seconds later by head unit 10-2 abruptly changing the viscosity if head unit 10-1 was unsuccessful to attempt to further slow the object 12-1, followed seconds later by head unit 12-3 abruptly changing the viscosity if head unit 10-2 was unsuccessful to attempt to further slow the object 12-1.

FIG. 1B is a graph of viscosity vs. shear rate for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

A relationship between compressive impulse (e.g., shear rate) and the viscosity of the shear thickening fluid is nonlinear and may comprise one or more inflection points as the piston travels within the chamber in response to different magnitudes of forces and different accelerations. The viscosity of the STF may also be a function of other influences, such as electric fields, acoustical waves, magnetic fields, and other similar influences. As a first example of a response of a shear thickening fluid, a first range of shear rates in zone A has a decreasing viscosity as the shear rate increases and then in a second range of shear rates in zone B the viscosity increases abruptly. As a second example of a response of a diluted shear thickening fluid, the first range of shear rates in zone A extends to a higher level of shear rates with the decreasing viscosity and then in the still higher second range of shear rates in zone B the viscosity increases abruptly similar to that of the shear thickening include.

The shear thickening fluid includes particles within a solvent. Examples of particles of the shear thickening fluid include oxides, calcium carbonate, synthetically occurring minerals, naturally occurring minerals, polymers, or a mixture thereof. Further examples of the particles of the shear thickening fluid include $SiO_2$, polystyrene, or polymethylmethacrylate.

The particles are suspended in a solvent. Example components of the solvent include water, a salt, a surfactant, and a polymer. Further example components of the solvent include ethylene glycol, polyethylene glycol, ethanol, silicon oils, phenyltrimethicone or a mixture thereof. Example particle diameters range from less than 100 μm to less than 1 millimeter. In an instance, the shear thickening fluid is made of silica particles suspended in polyethylene glycol at a volume fraction of approximately 0.57 with the silica particles having an average particle diameter of approximately 446 nm. As a result, the shear thickening fluid exhibits a shear thickening transition at a shear rate of approximately 102-103 s–1.

A volume fraction of particles dispersed within the solvent distinguishes the viscosity versus shear rate of different shear thickening fluids. The viscosity of the STF changes in response to the applied shear stress. At rest and under weak applied shear stress, a STF may have a fairly constant or even slightly decreasing viscosity because the random distribution of particles causes the particles to frequently collide. However, as a greater shear stress is applied so that the shear rate increases, the particles flow in a more streamlined manner. However, as an even greater shear stress is applied so that the shear rate increases further, a hydrodynamic coupling between the particles may overcome the interparticle forces responsible for Brownian motion. The particles may be driven closer together, and the microstructure of the colloidal dispersion may change, so that particles cluster together in hydroclusters.

The viscosity curve of the STF can be fine-tuned through changes in the characteristics of the particles suspended in the solvent. For example, the particles shape, surface chemistry, ionic strength, and size affect the various interparticle forces involved, as does the properties of the solvent. However, in general, hydrodynamic forces dominate at a high shear stress, which also makes the addition of a polymer attached to the particle surface effective in limiting clumping in hydroclusters. Various factors influence this clumping behavior, including, fluid slip, adsorbed ions, surfactants, polymers, surface roughness, graft density (e.g., of a grafted polymer), molecular weight, and solvent, so that the onset of shear thickening can be modified. In general, the onset of shear thickening can be slowed by the introduction of techniques to prevent the clumping of particles. For example, influencing the STF with emissions from an emitter in proximal location to the chamber.

FIG. 1C is a graph of piston velocity vs. force applied to the piston for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

An example curve for a shear thickening fluid indicates that as more force is applied to the piston in zone A, a higher piston velocity is realized until the corresponding transition to zone B occurs where the shear threshold affect takes hold and the viscosity abruptly increases significantly. When the viscosity increases abruptly, the piston velocity slows back down and may even stop.

Another example curve for a diluted shear thickening fluid indicates that as more force is applied to the piston in zone A, an even higher piston velocity is realized until the corresponding transition to zone B occurs where the shear threshold affect takes hold and the viscosity abruptly increases significantly. When the viscosity increases abruptly, the piston velocity slows back down and may even stop.

FIG. 2A is a schematic block diagram of an embodiment of the computing entity (e.g., 20-1 through 20-N; and 22) of the mechanical and computing system of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
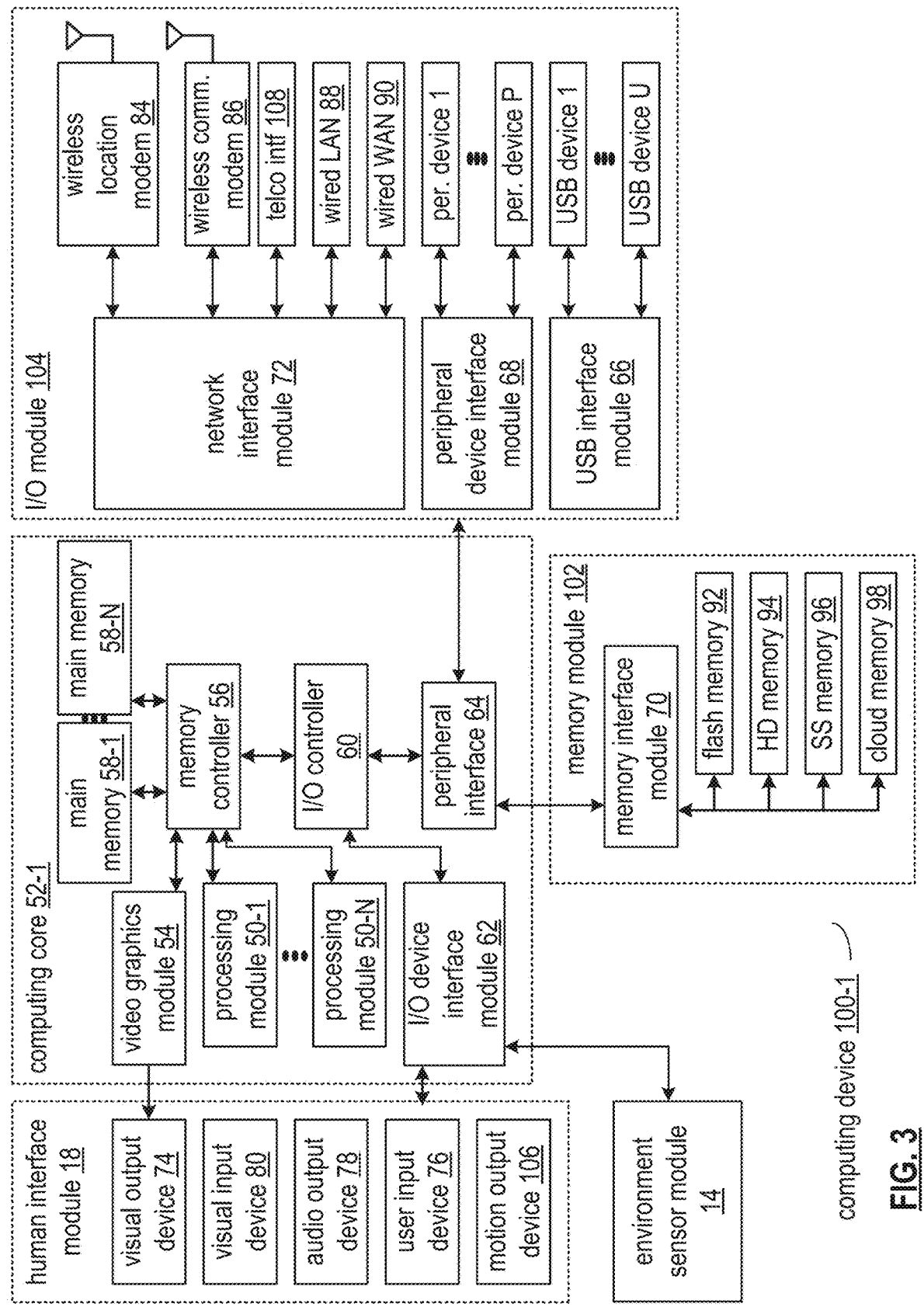
FIG. 3 is a schematic block diagram of another embodiment of a computing device of a computing system in accordance with the present invention.

FIG. 3 is a schematic block diagram of another embodiment of the computing device 100-1 of the mechanical and computing system of FIG. 1 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

Figure 4:
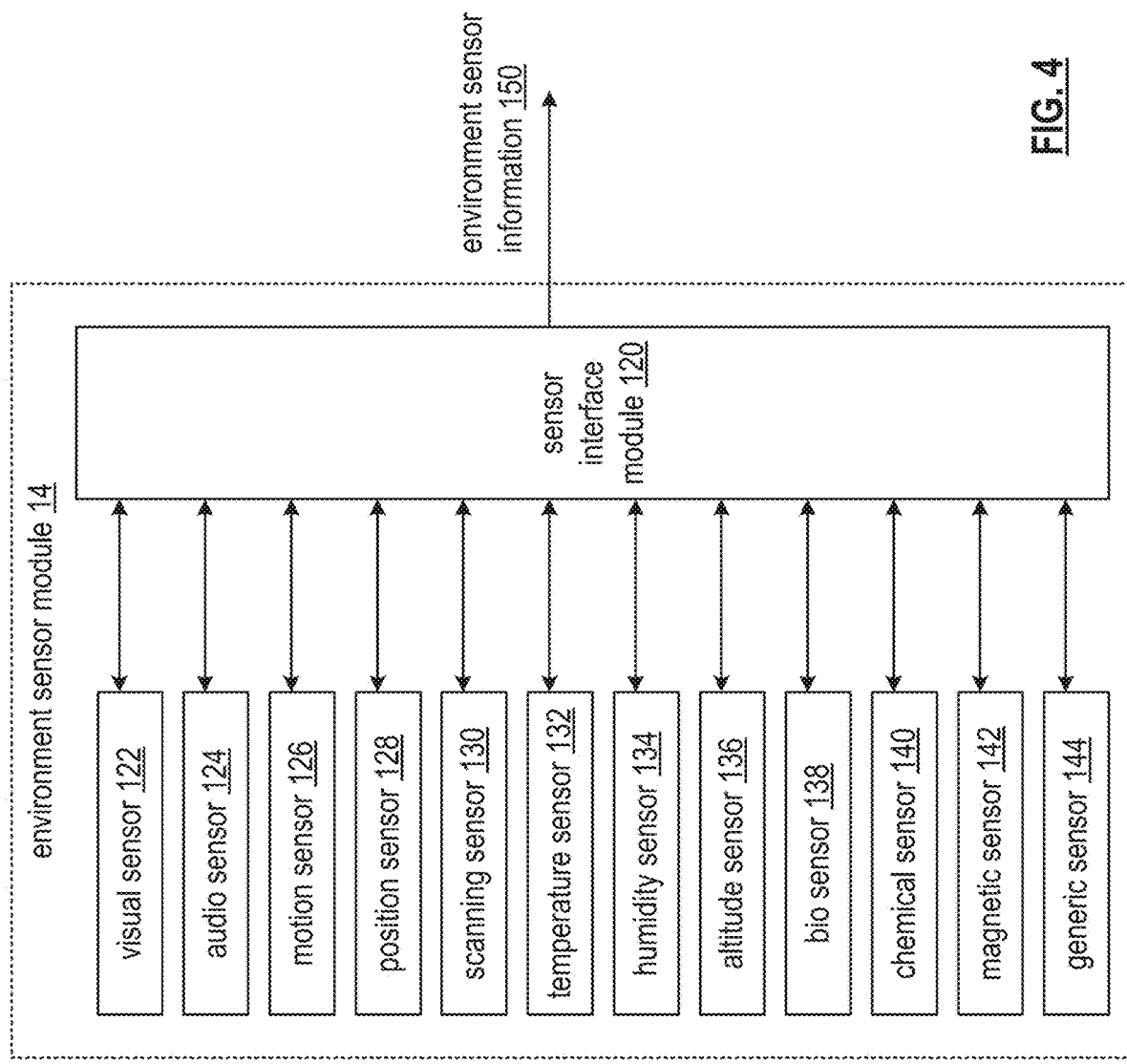
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
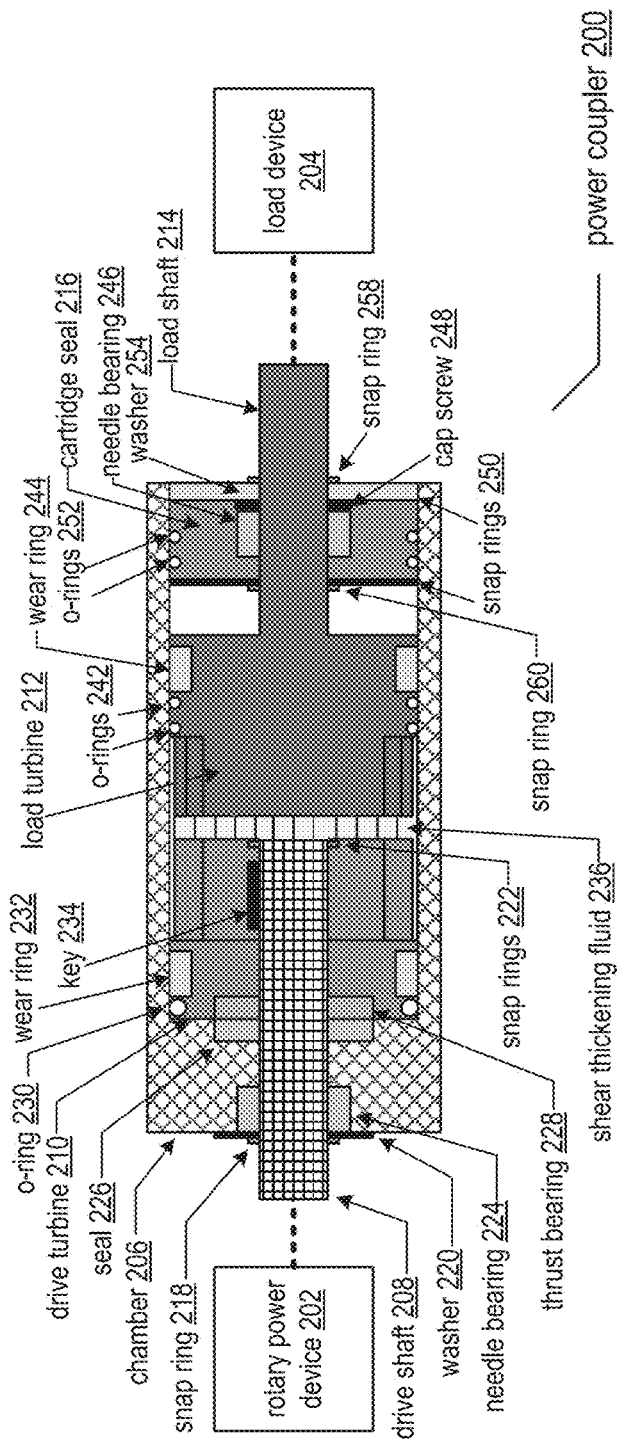
FIG. 5A is a cross-section diagram of an embodiment of a rotary power coupler in accordance with the present invention.

FIG. 5A is a cross-section diagram of an embodiment of a rotary power coupler 200 that couples rotary power from a rotary power device 202 to a load device 204. The rotary power device 202 includes one or more of a variety of power sources such as a fossil fuel engine, a hydro-turbine, a steam turbine, an electric motor, a servo motor, and a combination of any of the above. The load device 204 includes any type of device powered by and/or using rotary motion such as a vehicle, a wheel, an elevator, a conveyor system, an automatic door, etc.

The power coupler 200 includes a chamber 206, a driveshaft 208, a drive turbine 210, a load turbine 212, a load shaft 214, and a cartridge seal 216. The chamber 206 has an interior cylindrical shape and either an external cylindrical shape or a hexagonal external shape. In a primary embodiment the chamber 206 is affixed to a nonmoving structure associated with at least one of the rotary power device 202, the load device 204, or another stationary object. The primary embodiment is associated with free rotational movement of the driveshaft 208 and the load shaft 214. In a second embodiment, the chamber 206 substantially rotates in unison with the driveshaft 208 (e.g., the chamber 206 is not fixed to a stationary object). In a third embodiment, the chamber 206 substantially rotates in unison with the load shaft 214 (e.g., the chamber 206 is not fixed to a stationary object).

The power coupler 200 further includes a snap ring 218 and a washer 220 combined to hold a first end of the driveshaft 208 in a fixed position with regards to the chamber 206. Snap rings 222 hold the drive turbine 210 to the other end of the driveshaft 208. The power coupler 200 further includes a needle bearing 224 to facilitate rotation of the driveshaft 208 within the chamber 206. The power coupler 200 further includes a seal 226 and a thrust bearing 228 to hold the drive turbine 210 in the fixed position with regards to the chamber 206.

The drive turbine 210 includes an O-ring 230 and a where ring 232 to facilitate sealing of the drive turbine 210 within the chamber 206. A key 234 facilitates mounting of the drive turbine 210 to the driveshaft 208. In an embodiment, the driveshaft 208 and the drive turbine 210 are separate components. In another embodiment, the driveshaft 208 and the drive turbine 210 are manufactured as a common component. The drive turbine 210 is discussed in further detail with reference to FIG. 5B.

Within the chamber 206 and between the drive turbine 210 and the load turbine 212 is a shear thickening fluid (STF) 236. Load turbine 212 includes O-rings 242 and a wear ring 244 to seal the load turbine 212 within the chamber 206. The load shaft 214 extends from the load turbine 212 through the cartridge seal 216 and is held in place within the chamber by a washer 254 and snap rings 260 and 258. In an embodiment, the load turbine 212 and the load shaft 214 are manufactured as a common component. In another embodiment, the load turbine 212 and the load shaft 214 are separate components. The cartridge seal 216 is held in place in an and of the chamber 206 in a fixed position by snap rings 250 and is sealed within the chamber 206 by o-rings 252. The load shaft 214 rotates within the cartridge seal 216 facilitated by needle bearing 246. The needle bearing 246 is secured within the cartridge seal 216 by a cap screw 248.

The STF 236 is configured to have a decreasing viscosity in response to a first range of shear rates and an increasing viscosity in response to a second range of shear rates, wherein the second range of shear rates are greater than the first range of shear rates as discussed with reference to FIG. 1B. The STF 236 includes a plurality of nanoparticles that includes one or more of an oxide, calcium carbonate, synthetically occurring minerals, naturally occurring minerals, polymers, $SiO_2$, polystyrene, polymethylmethacrylate, or a mixture of any of the above. The STF 236 further includes a solution to suspend the nanoparticles where the solution includes one or more of ethylene glycol, polyethylene glycol, ethanol, silicon oils, phenyltrimethicone, or a mixture of any of the above.

The chamber 206 is configured to contain a portion of the STF 236, where the chamber includes a cylindrical interior channel. The cylindrical interior channel includes a drive side section and a load side section.

The drive shaft 208 is housed at least partially radially within the drive side section and protruding outward from a drive side section end of the chamber for coupling to the rotary power device 202. The load shaft 214 is housed at least partially radially within the load side section and protruding outward from a load side section end of the chamber for coupling to the load device 204.

The drive turbine 210 is housed at least partially radially within the drive side section and coupled to the drive shaft 208. The drive turbine 210 is configured to exert pressure against the shear thickening fluid in response to rotary movement of the drive shaft from a rotary force applied to the drive shaft from the rotary power device.

The load turbine 212 is housed at least partially radially within the load side section at a fixed operational distance from the drive turbine and coupled to the load shaft. The load turbine configured to apply a secondary rotary force to the drive shaft in response to the pressure exerted against the shear thickening fluid from the drive turbine. The fixed operational distance between the drive turbine and the load turbine enables both the first range of shear rates and the second range of shear rates.

The cartridge seal 216 guides the load shaft 214 into the chamber 206. The cartridge seal facilitates containment of the STF 236 within the chamber 206. The cartridge seal remains in a fixed position relative to the chamber 206 (e.g., at an open end to facilitate manufacturability). The snap ring 258 serves as a retaining device to maintain the load shaft 214 in a fixed position within the cartridge seal 216 to establish the fixed operational distance between the drive turbine 210 and the load turbine 212.

Figure 5B:
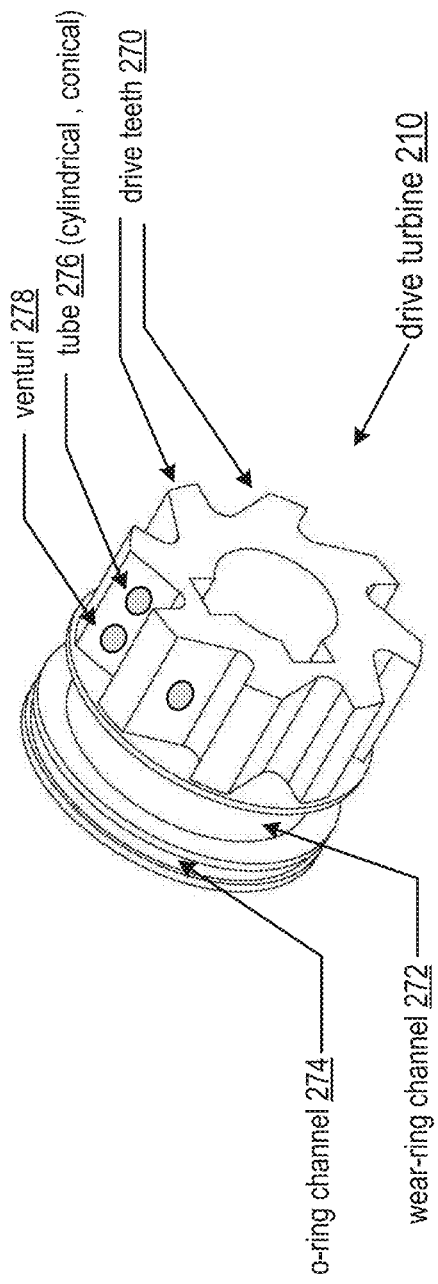
FIG. 5B is a diagram of an embodiment of a drive turbine in accordance with the present invention.

FIG. 5B is a diagram of an embodiment of the drive turbine 210 that includes an O-ring channel 274, a wear ring channel 272, and a rotary array of drive teeth 270 arranged in a gear pattern. The gear pattern includes one or more of spur, helical, spiral, bevel, worm drive, and herringbone.

In an embodiment, the drive teeth 270 include at least one of a variety of configurations. A first configuration includes a first tooth configured with at least one cylindrical tube 276 with substantially consistent diameter from one side of the first tooth to an opposite side of the first tooth.

A second configuration includes a second tooth configured with at least one conical shaped tube 276 with an increasing diameter from one side of the second tooth to an opposite side of the second tooth. A third configuration includes a third tooth configured with at least one conical shaped tube with a decreasing diameter from one side of the third tooth to the opposite side of the third tooth. This conical shaping of the diameter creates the first and second levels of shear forces of the STF when the drive turbine is rotating within the STF of the chamber.

A fourth configuration includes a fourth tooth configured with at least one venturi shaped tube 278 from one side of the fourth tooth to the opposite side of the fourth tooth. This Venturi shaping of the tube also creates the first and second levels of shear forces of the STF when the drive turbine is rotating within the STF of the chamber.

The arranged gear pattern of the rotary array of drive teeth is configured to provide the decreasing viscosity in response to the first range of shear rates of the STF in the chamber in response to a first range of rotary power from the rotary power device. The range gear pattern also provides the increasing viscosity in response to the second range of shear rates of the STF in the chamber in response to a second range of rotary power from the rotary power device. The second range of rotary power is greater than the first range of rotary power.

Figure 5C:
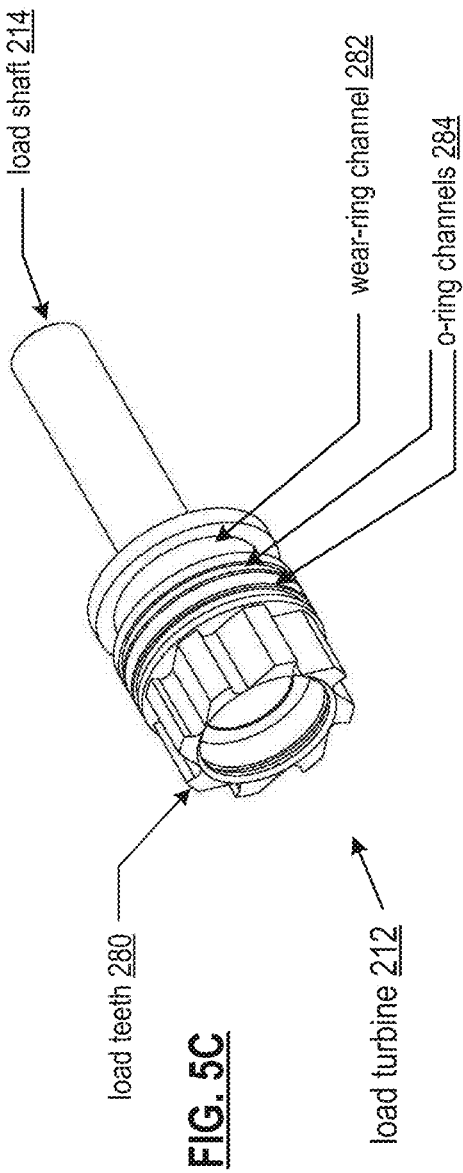
FIG. 5C is a diagram of an embodiment of a load turbine in accordance with the present invention.

FIG. 5C is a diagram of an embodiment of the load turbine 212 that includes the load shaft 214, a wear-ring channel 282, o-ring channels 284, and a rotary array of load teeth 280.

The rotary array of load teeth 280 are arranged in a gear pattern. The gear pattern includes one or more of spur, helical, spiral, bevel, worm drive, and herringbone. The gear pattern of the load turbine 212 complements the gear pattern of the rotary array of drive teeth of the drive turbine 210 such that the pressure exerted against the shear thickening fluid from the rotary array of drive teeth causes the rotary array of load teeth to apply the secondary rotary force to the drive shaft 214.

In an embodiment, the load teeth 280 include a variety of configurations. A first configuration includes a first tooth configured with at least one cylindrical tube with substantially consistent diameter from one side of the first tooth to an opposite side of the first tooth (e.g., like the tube 276 of the drive turbine 210).

A second configuration includes a second tooth configured with at least one conical shaped tube with an increasing diameter from one side of the second tooth to an opposite side of the second tooth. A third configuration includes a third tooth configured with at least one conical shaped tube with a decreasing diameter from one side of the third tooth to the opposite side of the third tooth (e.g., like the conical shaped tubes 276 of the drive turbine 210). A fourth configuration includes a fourth tooth configured with at least one venturi shaped tube from one side of the fourth tooth to the opposite side of the fourth tooth (e.g., like the venturi tube 278 of the drive turbine 210).

In another embodiment, none of the drive teeth 270 and none of the load teeth 280 include the above variety of configurations. In yet another embodiment, the drive teeth 270 include one or more holes and none of the load teeth 280 include holes. In a still further embodiment, none of the drive teeth 270 include holes and one or more of the load teeth 280 include one or more holes.

The arranged gear pattern of the rotary array of load teeth is configured to provide a first range of rotary output power to the load shaft in response to the first range of shear rates of the STF in the chamber resulting from a first range of rotary power from the rotary power device that causes the decreasing viscosity. The arranged gear pattern of the rotary array of load teeth also provides a second range of rotary output power to the load shaft in response to the second range of shear rates of the STF in the chamber resulting from a second range of rotary power from the rotary power device that causes the increasing viscosity. The second range of rotary output power is greater than the first range of rotary output power.

Figure 5D:
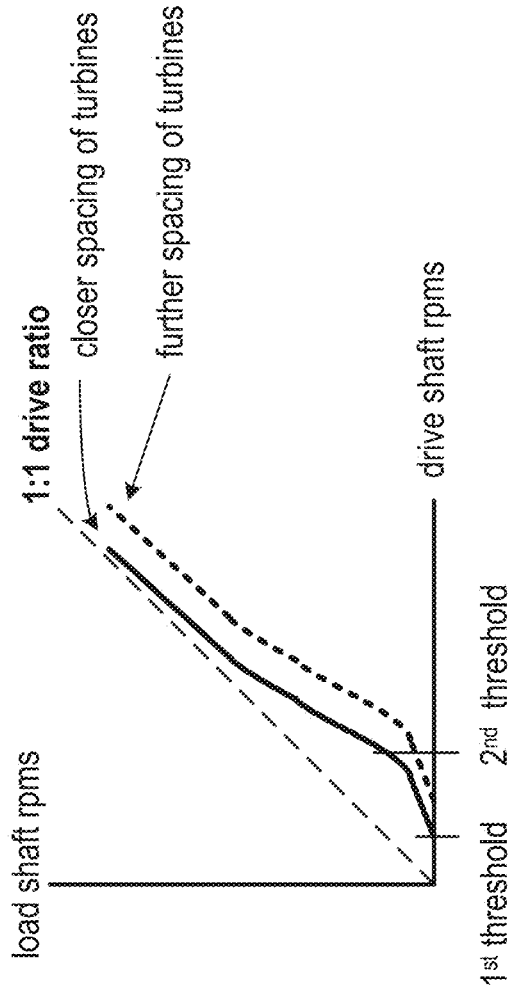
FIGS. 5D-5E are graphs portraying embodiments of operation of a rotary power coupler in accordance with the present invention.
Figure 5E:
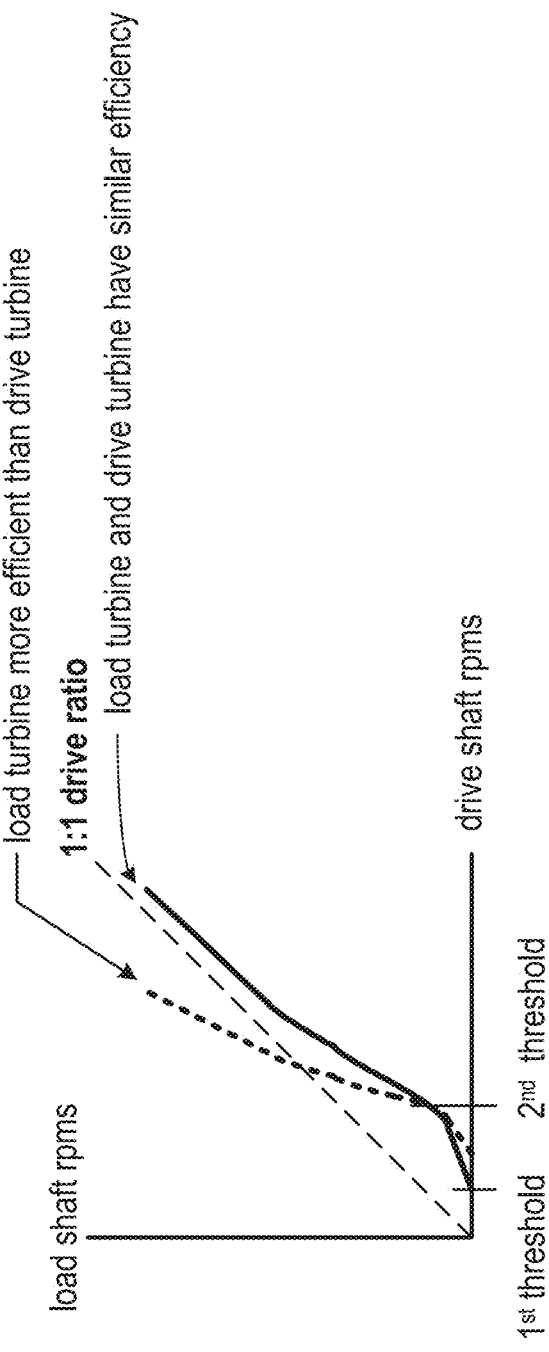

FIGS. 5D-5E are graphs portraying embodiments of operation of the rotary power coupler 200. FIG. 5D illustrates driveshaft revolutions per minute (RPMs) versus load shaft RPMs. As the driveshaft begins to rotate and establishes a first threshold level of RPMs, the STF experiences the first range of shear rates and caused by the drive turbine which starts to move the load turbine within the first range of viscosity and hence the load shaft begins to turn.

As the driveshaft RPMs increase, a second threshold of driveshaft RPMs is established where the STF experiences the second range of shear rates caused by the drive turbine which moves the load turbine with increased force as the second range of viscosity is established and hence the load shaft begins to turn even more rapidly. For similar patterns of teeth of the drive turbine and load turbine, and as the second range of viscosity is established, the load shaft RPMs are similar to the driveshaft RPMs (e.g., approaching a 1:1 drive ratio) when the distance between the turbines is very close. The efficiency of the drive ratio is lowered as the turbines are separated since less STF is in play to move the load turbine and the amount of STF experiencing the second range of viscosity is lowered.

FIG. 5E also illustrates driveshaft revolutions per minute (RPMs) versus load shaft RPMs for an embodiments where the gear patterns are different between the drive turbine and the load turbine. The dotted line illustrates an embodiment where the load turbine is more efficient than the drive turbine (e.g., more teeth, more aggressive tapering of the tubes through the teeth). As the driveshaft begins to rotate and establishes a first threshold level of RPMs, the STF experiences the first range of shear rates and caused by the drive turbine which starts to move the load turbine within the first range of viscosity and hence the load shaft begins to turn.

As the driveshaft RPMs increase, a second threshold of driveshaft RPMs is established where the STF experiences the second range of shear rates caused by the drive turbine which moves the load turbine with increased force as the second range of viscosity is established and hence the load shaft begins to turn even more rapidly. For similar patterns of teeth of the drive turbine and load turbine, and as the second range of viscosity is established, the load shaft RPMs are similar to the driveshaft RPMs (e.g., approaching a 1:1 drive ratio). When the gear pattern of the load turbine is more efficient than the gear pattern of the drive turbine, the STF moved by the drive turbine moves the load turbine with more RPMs (e.g., higher than 1:1) during the utilization of the second viscosity range of the STF as illustrated by the dotted line.

Figure 6A:
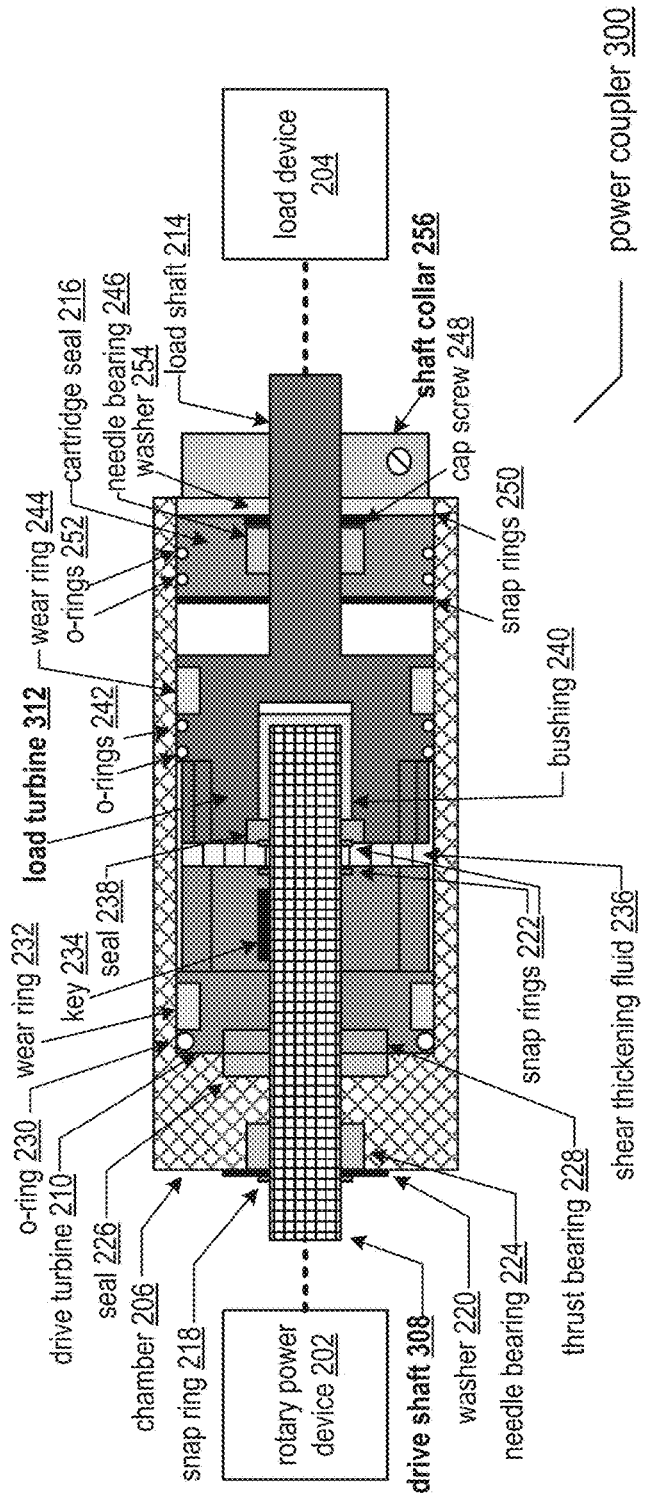
FIG. 6A is a cross-section diagram of an embodiment of another rotary power coupler in accordance with the present invention.

FIG. 6A is a cross-section diagram of an embodiment of another rotary power coupler 300. The power coupler 300 includes all the components of the power coupler 200 with the exception of the snap rings 258 and 260. The power coupler 300 substitutes a shaft collar 256 for the snap rings 258 and 260.

Within the chamber 206 of the power coupler 300 and between the drive turbine 210 and a load turbine 312 is a shear thickening fluid (STF) 236. Load turbine 312 includes O-rings 242 and a wear ring 244 to seal the load turbine 312 within the chamber 206. The load shaft 214 extends from the load turbine 312 through the cartridge seal 216 and is held in place within the chamber by the washer 254 and the shaft collar 256. The cartridge seal 216 is held in place in an end of the chamber 206 in a fixed position by snap rings 250 and is sealed within the chamber 206 by o-rings 252. The load shaft 214 rotates within the cartridge seal 216 facilitated by needle bearing 246. The needle bearing 246 is secured within the cartridge seal 216 by a cap screw 248.

The STF 236 is configured to have a decreasing viscosity in response to a first range of shear rates and an increasing viscosity in response to a second range of shear rates, wherein the second range of shear rates are greater than the first range of shear rates as discussed with reference to FIG. 1B. The STF 236 includes a plurality of nanoparticles that includes one or more of an oxide, calcium carbonate, synthetically occurring minerals, naturally occurring minerals, polymers, SiO2, polystyrene, polymethylmethacrylate, or a mixture of any of the above. The STF 236 further includes a solution to suspend the nanoparticles where the solution includes one or more of ethylene glycol, polyethylene glycol, ethanol, silicon oils, phenyltrimethicone, or a mixture of any of the above.

The chamber 206 is configured to contain a portion of the STF 236, where the chamber includes a cylindrical interior channel. The cylindrical interior channel includes a drive side section and a load side section.

A drive shaft 308 is housed at least partially radially within the drive side section and protruding outward from a drive side section end of the chamber for coupling to the rotary power device 202. The load shaft 214 is housed at least partially radially within the load side section and protruding outward from a load side section end of the chamber for coupling to the load device 204.

The drive turbine 210 is housed at least partially radially within the drive side section and coupled to the drive shaft 308. The drive turbine 210 is configured to exert pressure against the shear thickening fluid in response to rotary movement of the drive shaft from a rotary force applied to the drive shaft from the rotary power device.

The load turbine 312 is housed at least partially radially within the load side section at an adjustable operational distance from the drive turbine and coupled to the load shaft. The load turbine is configured to apply a secondary rotary force to the drive shaft in response to the pressure exerted against the shear thickening fluid from the drive turbine. The adjustable operational distance between the drive turbine and the load turbine enables both the first range of shear rates and the second range of shear rates.

The shaft collar 256 is configured to establish the adjustable operational distance from the drive turbine to the load turbine. For example, a set screw is loosened to enable sliding the load shaft 214 either way and tightened once a desired operational distance is established.

The cartridge seal 216 guides the load shaft 214 into the chamber 206. The cartridge seal facilitates containment of the STF 236 within the chamber 206. The cartridge seal remains in a fixed position relative to the chamber 206 (e.g., at an open end to facilitate manufacturability).

Figure 6B:
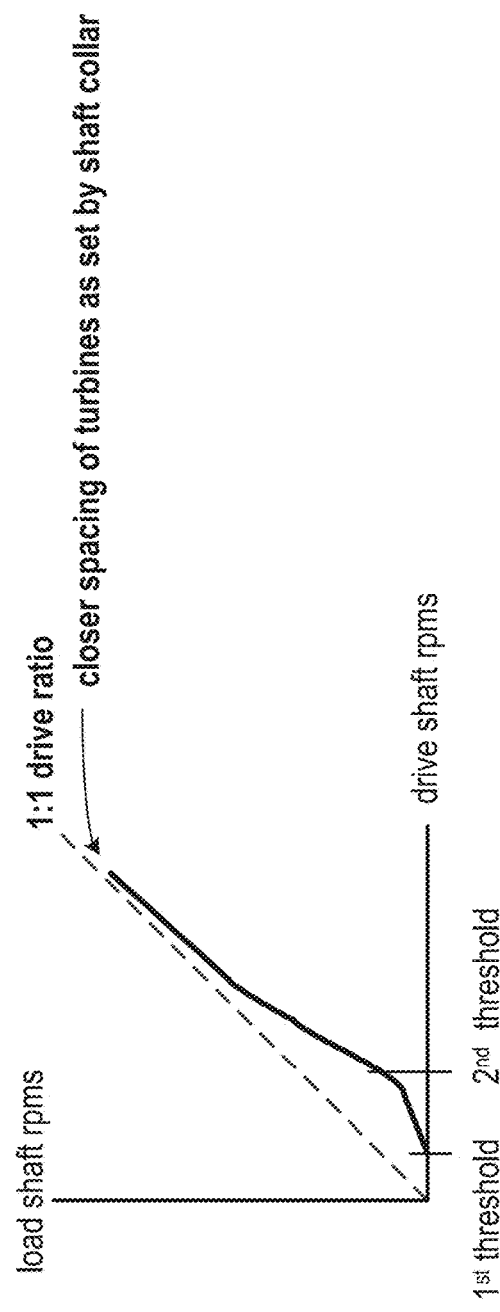
FIG. 6B is a graph portraying an embodiment of operation of another rotary power coupler in accordance with the present invention.

FIG. 6B is a graph portraying an embodiment of operation of the rotary power coupler 300 with closer spacing of the turbines as set by the shaft collar 256 illustrating driveshaft revolutions per minute (RPMs) versus load shaft RPMs. As the driveshaft begins to rotate and establishes a first threshold level of RPMs, the STF experiences the first range of shear rates and caused by the drive turbine which starts to move the load turbine within the first range of viscosity and hence the load shaft begins to turn.

As the driveshaft RPMs increase, a second threshold of driveshaft RPMs is quickly established due to the close spacing where the STF experiences the second range of shear rates caused by the drive turbine which moves the load turbine with increased force as the second range of viscosity is established and hence the load shaft begins to turn even more rapidly. For similar patterns of teeth of the drive turbine and load turbine, and as the second range of viscosity is established, the load shaft RPMs are similar to the driveshaft RPMs (e.g., approaching a 1:1 drive ratio) when the distance between the turbines is very close.

Figure 6C:
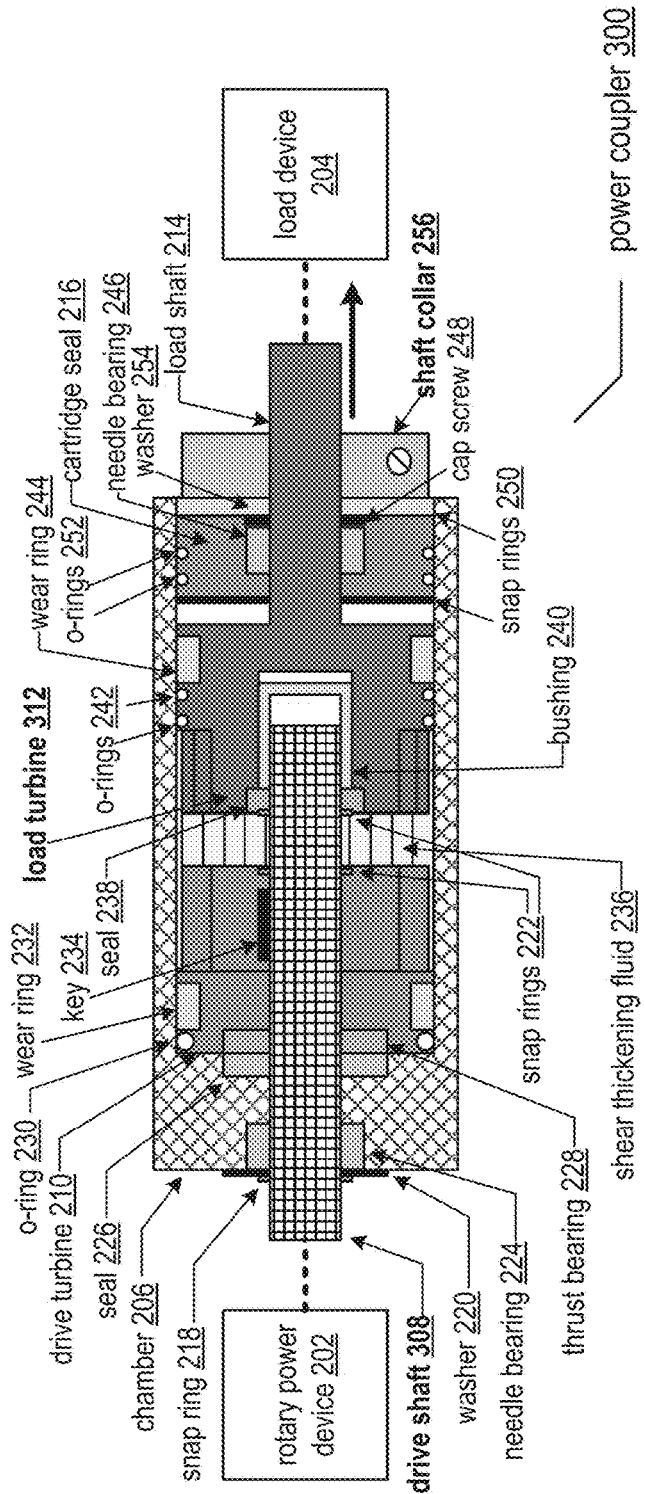
FIG. 6C is a cross-section diagram of another embodiment of a rotary power coupler in accordance with the present invention.

FIG. 6C is a cross-section diagram of another embodiment of the rotary power coupler 300 where the turbines are separated by a greater distance than as illustrated in FIG. 6A. As such, lower shear forces are in play for the shear thickening fluid 236 between the drive turbine 210 and the load turbine 312. The shaft collar 256 is field adjusted to establish the further distance between the turbines.

Figure 6D:
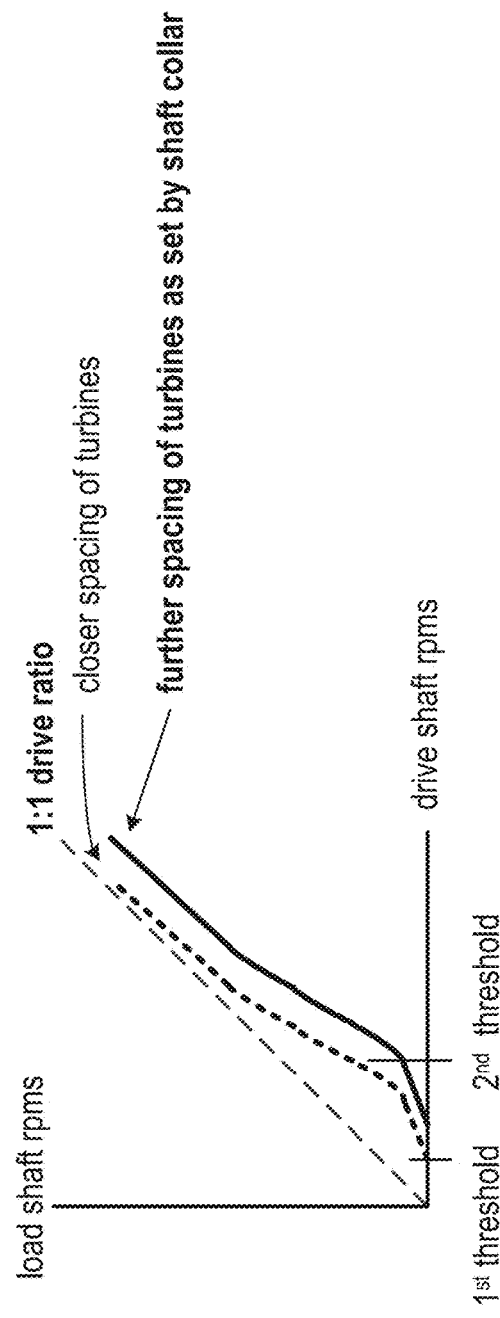
FIG. 6D is a graph portraying another embodiment of operation of a rotary power coupler in accordance with the present invention.

FIG. 6D is a graph portraying another embodiment of operation of the rotary power coupler 300 with further spacing of the turbines as set by the shaft collar 256 illustrating driveshaft revolutions per minute (RPMs) versus load shaft RPMs. As the driveshaft begins to rotate and establishes a new first threshold level of RPMs, the STF experiences the first range of shear rates and caused by the drive turbine which starts to move the load turbine within the first range of viscosity and hence the load shaft begins to turn.

As the driveshaft RPMs increase, a new second threshold of driveshaft RPMs is finally established due to the further spacing where the STF begins to experience the second range of shear rates caused by the drive turbine which moves the load turbine with some increased force as the second range of viscosity is established and hence the load shaft begins to turn more rapidly. For similar patterns of teeth of the drive turbine and load turbine, and as the second range of viscosity is at least in part established, the load shaft RPMs approach a maximum percentage of the driveshaft RPMs (e.g., approaching something less than a 1:1 drive ratio) when the distance between the turbines is further away.

Figure 7A:
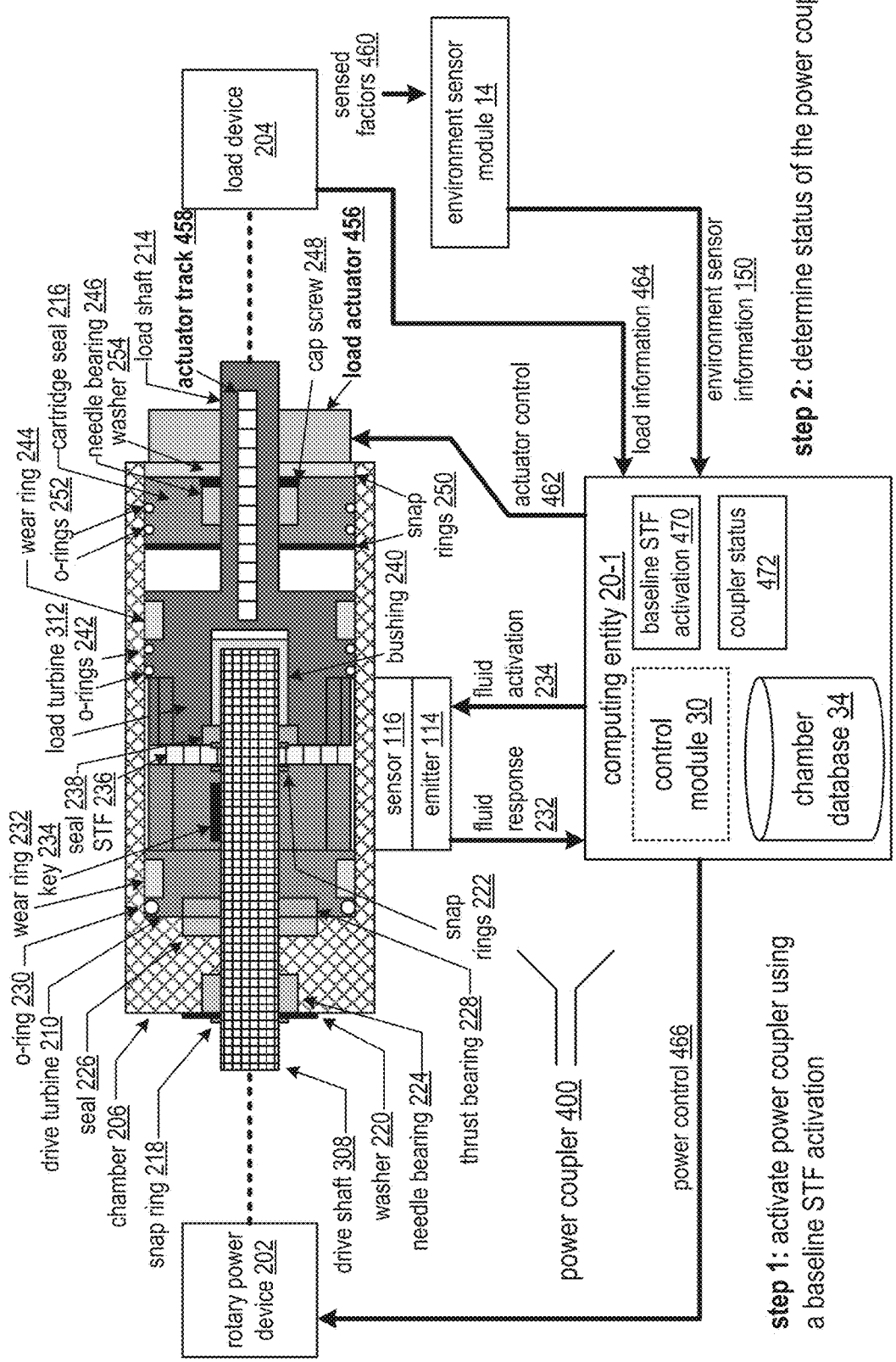
FIGS. 7A-7B are cross-section diagrams of an embodiment of another rotary power coupler illustrating an example of controlling coupling of rotary power in accordance with the present invention.
Figure 7B:
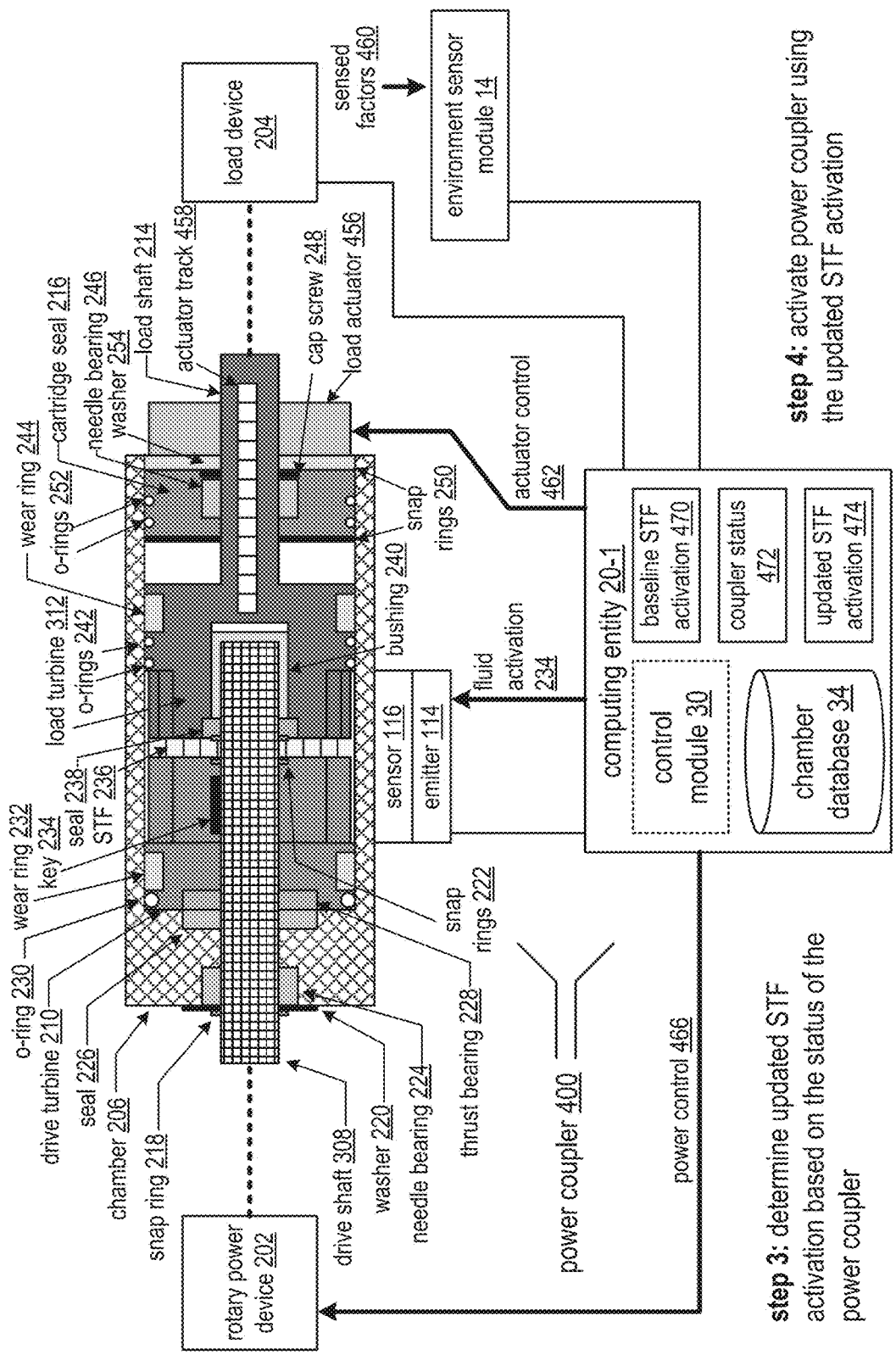

FIGS. 7A-7B are cross-section diagrams of an embodiment of another rotary power coupler 400 illustrating an example of controlling coupling of rotary power. The power coupler 400 includes the components of the power coupler 300 with the exception of a load actuator 456 replacing the shaft collar 256 and an actuator track 458 associated with the load shaft 214. The power coupler 400 further includes the computing entity 20-1 of FIG. 1, the environment sensor module 14 of FIG. 2B, the sensor 116 of FIG. 1, and the emitter 114 of FIG. 1.

The load actuator 456 is configured to establish an adjustable operational distance from the drive turbine to the load turbine. For example, a motor of the load actuator 456 moves the actuator track 458 to push or pull the load shaft 214 within the chamber 206.

The sensor 116 includes a set of fluid flow sensors to produce a fluid response of the STF 236. The set of fluid flow sensors are positioned proximal to the chamber 206. The set of fluid flow sensors includes a load turbine position sensor, a load actuator position sensor, and an actuator track position sensor.

The emitter 114 includes a set of fluid manipulation emitters positioned proximal to the chamber 206. The set of fluid manipulation emitters provide a fluid activation (e.g., selecting a shear rate range of the STF) to at least one of the STF 236 and the load actuator 456 to enable selection of the first range of shear rates and the second range of shear rates.

The computing entity 20-1 includes the control module 30 in the chamber database 34 of FIG. 1. The environment sensor module 14 senses sensed factors 460 associated with the load device 204 and provides environmental sensor information 150 to the computing entity 20-1. The sensed factors 460 includes RPMs associated with the load device 204, any movement of an object associated with the load device 204, and anything associated with another object indirectly associated with the load device 204 within a common environment.

FIG. 7A illustrates steps of an example method of operation of the power coupler 400 where a first step includes the computing entity 20-1 activating the power coupler 400 using a baseline STF activation 470. An STF activation includes creating an environment within the chamber 206 for the STF to experience a desired first or second range of shear rates and hence the first or second range of viscosities of the STF to provide a desired level of power coupling from the rotary power device 202 to the load device 204. A baseline STF activation includes an initial set of STF activations that are expected to produce the desired level of power coupling.

The set of baseline STF activation includes providing a default level of power in a power control 466 signal to the rotary power device 202, outputting a default fluid activation signal to the emitter 114 to modify the STF for an initial shear force versus viscosity curve, and moving the load shaft 214 via the load actuator 456 to a starting position for a default separation of the turbines that is expected to experience a desired level of shear forces of the STF between the turbines. For instance, the control module 30 outputs the power control 466 to the rotary power device 202, outputs the fluid activation 234 to the emitter 114, and outputs actuator control 462 to the load actuator 456 to achieve the desired turbine spacing.

Having activated the power coupler 400 using the baseline STF activation, a second step of the example method of operation includes the computing entity 20-1 determining a coupler status 472 of the power coupler 400. The status of the power coupler 400 includes one or more of a power conversion factor between the rotary power device 202 and the load device 204, RPMs of the rotary power device 202 verses RPMs of the load device 204, the STF fluid response (e.g., which range of shear rates at present), position and utilization information associated with the load device 204, and information with regards to the sensed factors 460. The determining of the status includes a variety of alternatives.

In a first alternative example, the control module 30 interprets fluid response 232 from the sensor 116 to determine status of shear rates of the STF. As another alternative example, the control module 30 interprets load information 464 from the load device 204 to determine the position and utilization information associated with the load device 204. As yet another alternative example, the control module 30 interprets environment sensor information 150 from the environment sensor module 14 to determine results from the sensed factors 460 with regards to movement of any object associated with the load device 204.

FIG. 7B further illustrates the example method of operation where in a third step the computing entity 20-1 determines an updated STF activation 474 based on the status of the power coupler 400. The determining includes identifying a desired status of the power coupler and determining changes to affect the power coupler to move from the current status to the desired status. The identifying the desired status includes at least one of performing a lookup, interpreting a received message, and determining the desired status. For example, the control module 30 retrieves the desired status from the chamber database 34 for load device 204.

The determining the changes to affect the power coupler includes a variety of alternatives. A first alternative includes increasing the STF viscosity when delivered power is less than desired (e.g., an object associated with the load device 204 is not moving fast enough). In an instance, the control module 30 determines a new fluid activation 234 to modify the STF for a higher viscosity. As another instance, the control module 30 determines to reduce the gap between the turbines to increase the viscosity. As yet another example, the control module 30 determines to increase power to the rotary power device 202 to raise the delivered power.

A second alternative includes decreasing the STF viscosity when the delivered power is greater than desired (e.g., the object associated with the load device is moving too fast). In an instance, the control module 30 determines the new fluid activation 234 to modify the STF for a lower viscosity. As another instance, the control module 30 determines to increase the gap between the turbines to decrease the viscosity. As yet another example, the control module 30 determines to lower the power to the rotary power device 202 to lower the delivered power.

Having determined the updated STF activation, a fourth step of the example method of operation includes the computing entity 20-1 applying the updated STF activation to the power coupler 400 to facilitate the transferring of the rotary power from the rotary power device to the load device. For example, the control module 30 outputs an updated actuator control 462 to the load actuator 456 in accordance with the updated STF activation to facilitate an updated separation of the turbines (e.g., closer for more viscosity to transfer more power for speeding up or even hard braking, further away for less viscosity to slow down or to coast). As another example, the control module 30 outputs an updated fluid activation 234 to the emitter 114 to modify the viscosity of the STF in accordance with the updated STF activation (e.g., more viscosity to transfer more power for speeding up or hard braking, less viscosity to slow down or to coast). As yet another example, the control module 30 outputs an updated power control 466 to the rotary power device 202 to either increase or decrease the power in accordance with the updated STF activation.

Figure 7C:
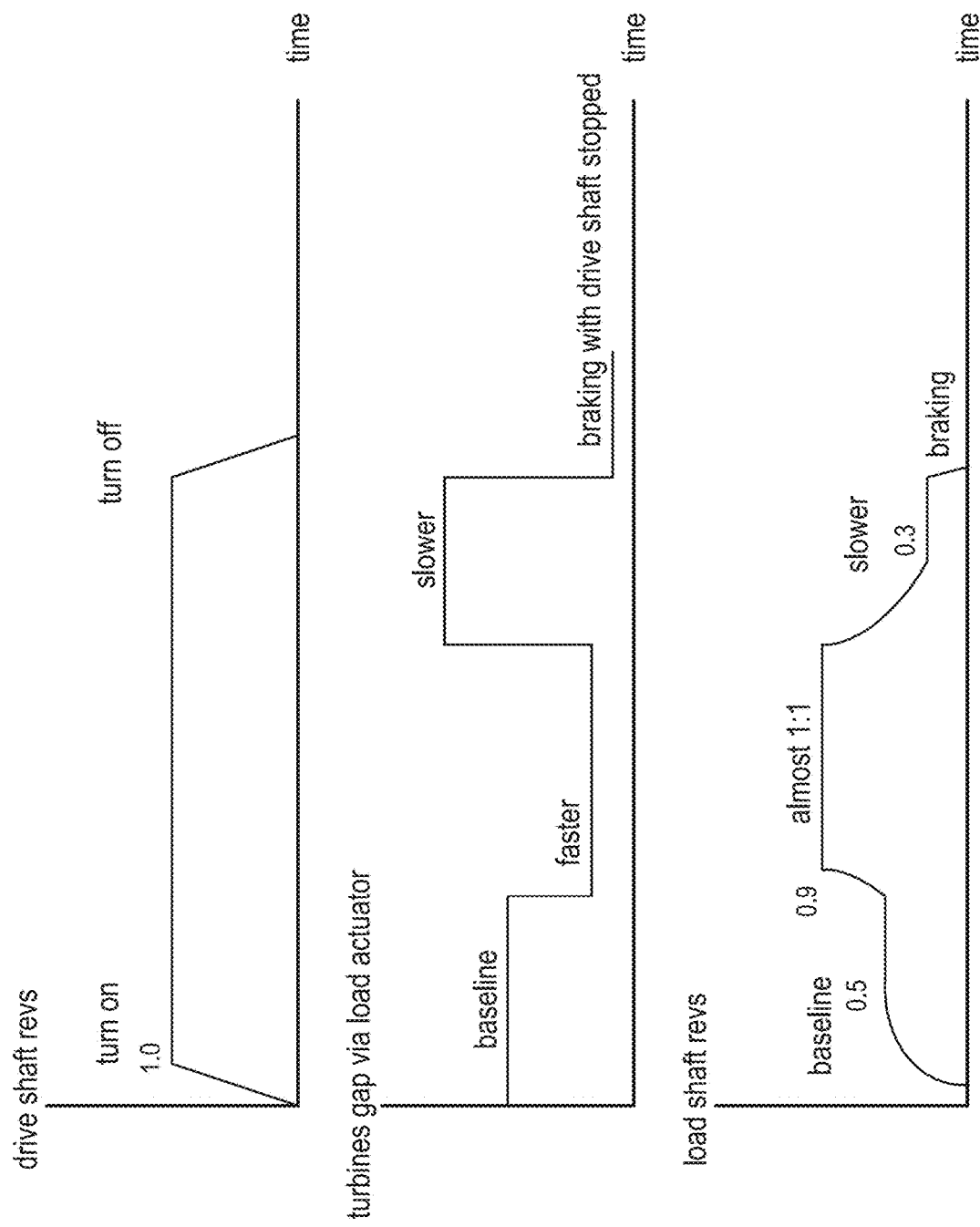
FIG. 7C is a timing diagram set portraying an embodiment of operation of another rotary power coupler in accordance with the present invention.

FIG. 7C is a timing diagram set portraying an embodiment of operation of rotary power coupler 400. With the driveshaft running turning at a reference 1.0 and the gap between the turbines at a baseline separation, the STF between the turbines engages such that the load shaft turns at a reference rate of 0.5.

When the desired power transfer is to spin the load shaft at a higher speed, the gap between the turbines is lowered to speed up the load turbine such that the load shaft turns at a reference rate of 0.9 (e.g., almost 1:1 ratio). Later, the gap between the turbines is widened such that the load turbine and load shaft spin slower at a reference rate of 0.3. Next the power to the rotary power device is turned off and the distance between the turbines is closed up to a very close gap such that the load shaft spends down very quickly in unison with the drive shaft to provide braking.

The method described above in conjunction with a processing module of any computing entity of the mechanical and computing system of FIG. 7A can alternatively be performed by other modules of the system of FIG. 7A or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system, cause one or more computing devices of the mechanical and computing system of FIG. 7A to perform any or all of the method steps described above.

Figure 8A:
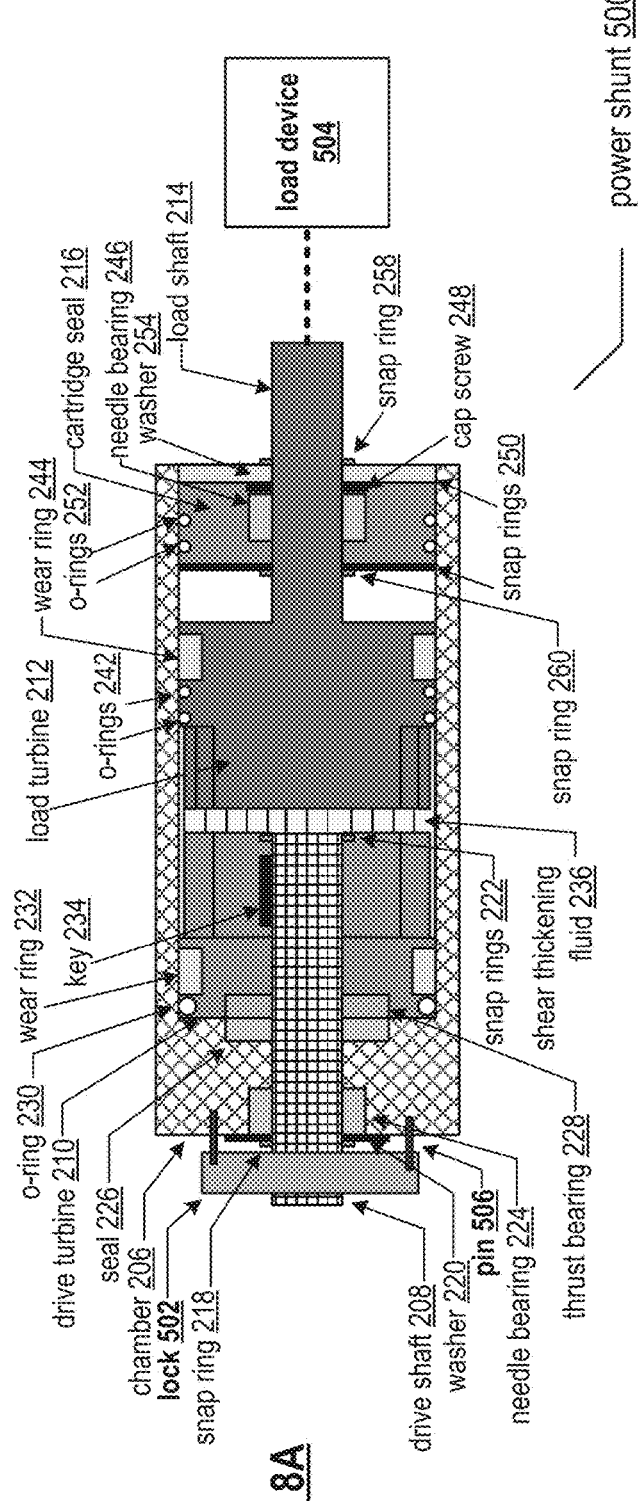
FIG. 8A is a cross-section diagram of an embodiment of a rotary power shunt in accordance with the present invention.

FIG. 8A is a cross-section diagram of an embodiment of a rotary power shunt 500 that includes all the components of the power coupler 200 along with a lock 502 and pins 506. The power shunt 500 shunts rotational power from a load device 504 providing a braking action as desired. The load device 504 includes any type of device powered by and/or using rotary motion such as a vehicle, a wheel, an elevator, a conveyor system, an automatic door, etc.

The STF 236 is configured to have a decreasing viscosity in response to a first range of shear rates and an increasing viscosity in response to a second range of shear rates, wherein the second range of shear rates are greater than the first range of shear rates as discussed with reference to FIG. 1B. The STF 236 includes a plurality of nanoparticles that includes one or more of an oxide, calcium carbonate, synthetically occurring minerals, naturally occurring minerals, polymers, SiO2, polystyrene, polymethylmethacrylate, or a mixture of any of the above. The STF 236 further includes a solution to suspend the nanoparticles where the solution includes one or more of ethylene glycol, polyethylene glycol, ethanol, silicon oils, phenyltrimethicone, or a mixture of any of the above.

The chamber 206 is configured to contain a portion of the STF 236, where the chamber includes a cylindrical interior channel. The cylindrical interior channel includes a drive side section and a load side section.

In an embodiment, the drive shaft 208 is housed at least partially radially within the drive side section and protruding outward from a drive side section end of the chamber for coupling to lock 502 configured to prevent rotation of the driveshaft 208. The load shaft 214 is housed at least partially radially within the load side section and protruding outward from a load side section end of the chamber for coupling to the load device 204.

In the embodiment, the drive turbine 210 is housed at least partially radially within the drive side section and coupled to the drive shaft 208. The drive turbine 210 is configured to exert resistive pressure against the shear thickening fluid in response to rotary movement of the load shaft from a rotary force applied to the load shaft from the load device.

In another embodiment, a fixed position of the drive turbine 210 with respect to the chamber 206 is provided by one or more of configuring the drive turbine 210 and the chamber 206 as substantially one component and configuring the drive turbine 210, the chamber 206, and the driveshaft 208 as substantially one component. In yet another embodiment, the driveshaft 208 is coupled to a stationary external object to provide the fixed position of the drive turbine 210. The stationary external object includes at least one of a lock, the rotary power device 202 locked in a stop position, and a servo motor that is held in a stopped position.

The load turbine 212 is housed at least partially radially within the load side section at a fixed operational distance from the drive turbine and coupled to the load shaft. The load turbine is configured to apply at least some of the rotary power from the load device via the load shaft to the STF. The STF, in response to the pressure exerted against the STF from the load turbine, exerts pressure on the drive turbine. The fixed operational distance between the drive turbine and the load turbine enables both the first range of shear rates and the second range of shear rates.

The cartridge seal 216 guides the load shaft 214 into the chamber 206. The cartridge seal facilitates containment of the STF 236 within the chamber 206. The cartridge seal remains in a fixed position relative to the chamber 206 (e.g., at an open end to facilitate manufacturability). The snap ring 258 serves as a retaining device to maintain the load shaft 214 in a fixed position within the cartridge seal 216 to establish the fixed operational distance between the drive turbine 210 and the load turbine 212.

The drive turbine 210 includes the rotary array of drive teeth arranged in the gear pattern. The arranged gear pattern of the rotary array of drive teeth of the power shunt 500 is configured to provide a first range of rotary output power to the drive shaft in response to the first range of shear rates of the STF in the chamber resulting from a first range of rotary power from the load device that causes the decreasing viscosity.

The arranged gear pattern of the rotary array of drive teeth of the power shunt 500 is further configured to provide a second range of rotary output power to the drive shaft in response to the second range of shear rates of the STF in the chamber resulting from a second range of rotary power from the load device that causes the increasing viscosity. The second range of rotary output power is greater than the first range of rotary output power. The operation of the power shunt 500 to provide braking power is further discussed with reference to FIG. 8B.

The load turbine 212 includes the rotary array of load teeth arranged in the gear pattern. The arranged gear pattern of the rotary array of load teeth of the power shunt 500 is configured to provide the decreasing viscosity in response to the first range of shear rates of the STF in the chamber in response to a first range of rotary power from the load device. The arranged gear pattern of the rotary array of load teeth of the power shunt 500 is further configured to provide the increasing viscosity in response to the second range of shear rates of the STF in the chamber in response to a second range of rotary power from the load device. The operation of the power shunt 500 to provide braking power is further discussed with reference to FIG. 8B.

Figure 8B:
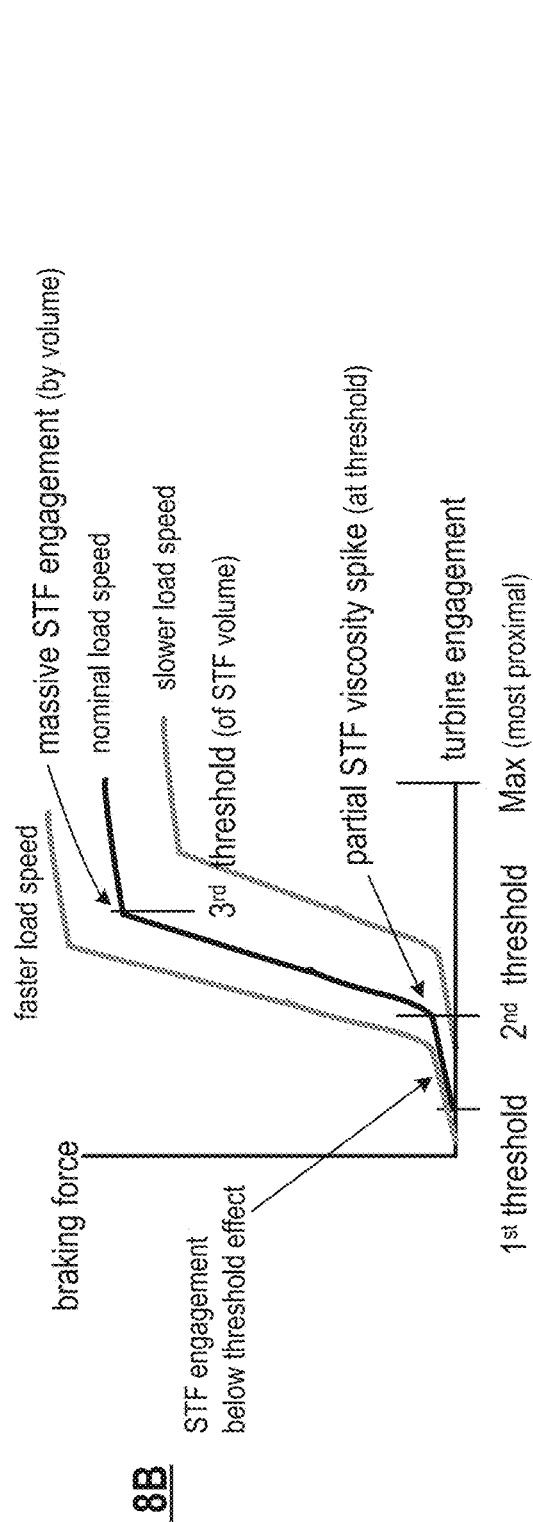
FIG. 8B is a graph portraying an embodiment of operation of a rotary power shunt in accordance with the present invention.

FIG. 8B is a graph portraying an embodiment of operation of a rotary power shunt illustrating turbine engagement versus braking force. The turbine engagement indicates proximity of the turbines, where a maximum level of turbine engagement means that the turbines are right next to each other with substantially no gap. No engagement means that the turbines are separated so much that there is virtually no transfer of power via the STF between the turbines.

In an example of operation where a load speed of the load device 504 is a nominal level, STF engagement at a low and below threshold effect level starts as the turbine engagement is increased. Minimal braking force is achieved. Further braking force rapidly increases once the STF reaches the second threshold and the second viscosity range where the load turbine transfers more power to the drive turbine for shunting. At the closest turbine engagement, a massive STF engagement occurs where having already achieved the second range of viscosity, simply more volume of the STF is compressed and available to provide drive from the load turbine to the drive turbine to provide more braking force.

When the load speed is slower than the nominal load speed, the turbine engagement must be higher to achieve similar braking forces as illustrated by the gray line to the right. When the load speed is faster than the nominal load speed, the turbine engagement can be lowered to achieve similar braking forces as illustrated by the gray line to the left.

The power shunt 500 may be utilized as a governor of sorts by selecting a turbine engagement level to provide constant braking power to the load device 504 whenever it is above the threshold of the STF as it moves from the first range of viscosities to the second range of viscosities.

Figure 9A:
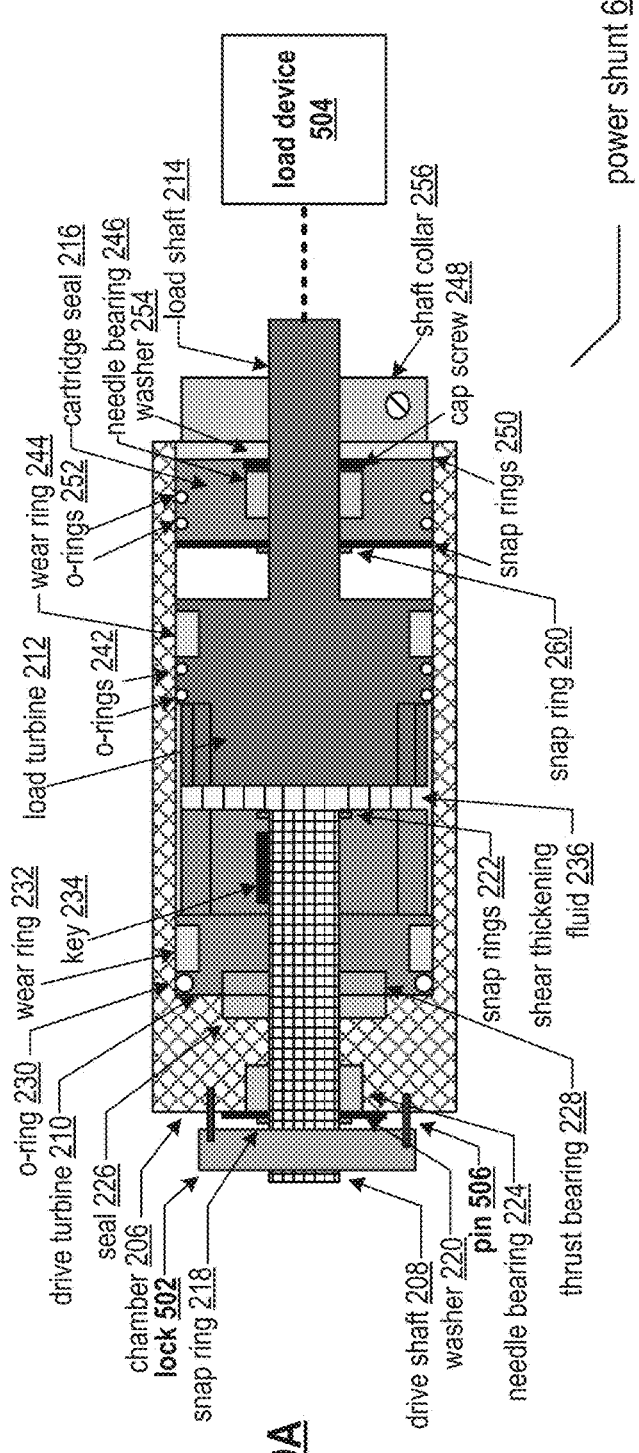
FIG. 9A is a cross-section diagram of an embodiment of another rotary power shunt in accordance with the present invention.

FIG. 9A is a cross-section diagram of another embodiment of a rotary power shunt 600 that includes all the components of the power coupler 300 along with the lock 502 and the pins 506. The power shunt 600 shunts rotational power from a load device 504 providing a braking action as desired. The load device 504 includes any type of device powered by and/or using rotary motion such as a vehicle, a wheel, an elevator, a conveyor system, an automatic door, etc.

The STF 236 is configured to have a decreasing viscosity in response to a first range of shear rates and an increasing viscosity in response to a second range of shear rates, wherein the second range of shear rates are greater than the first range of shear rates as discussed with reference to FIG. 1B. The STF 236 includes a plurality of nanoparticles that includes one or more of an oxide, calcium carbonate, synthetically occurring minerals, naturally occurring minerals, polymers, $SiO_2$, polystyrene, polymethylmethacrylate, or a mixture of any of the above. The STF 236 further includes a solution to suspend the nanoparticles where the solution includes one or more of ethylene glycol, polyethylene glycol, ethanol, silicon oils, phenyltrimethicone, or a mixture of any of the above.

The chamber 206 is configured to contain a portion of the STF 236, where the chamber includes a cylindrical interior channel. The cylindrical interior channel includes a drive side section and a load side section.

The drive shaft 208 is housed at least partially radially within the drive side section and protruding outward from a drive side section end of the chamber for coupling to lock 502 configured to prevent rotation of the driveshaft 208. The load shaft 214 is housed at least partially radially within the load side section and protruding outward from a load side section end of the chamber for coupling to the load device 204.

The drive turbine 210 is housed at least partially radially within the drive side section and coupled to the drive shaft 208. The drive turbine 210 is configured to exert resistive pressure against the shear thickening fluid in response to rotary movement of the load shaft from a rotary force applied to the load shaft from the load device.

The load turbine 212 is housed at least partially radially within the load side section at an adjustable operational distance from the drive turbine and coupled to the load shaft. The load turbine is configured to apply at least some of the rotary power from the load device via the load shaft to the STF. The STF, in response to the pressure exerted against the STF from the load turbine, exerts pressure on the drive turbine. The adjustable operational distance between the drive turbine and the load turbine enables both the first range of shear rates and the second range of shear rates.

The shaft collar 256 is configured to establish the adjustable operational distance from the drive turbine to the load turbine is a primary mechanism to establish turbine engagement and utilization of desired STF viscosity ranges. For example, a set screw can be field adjusted to enable moving and then establishing the gap between the turbines at a desired level.

The cartridge seal 216 guides the load shaft 214 into the chamber 206. The cartridge seal facilitates containment of the STF 236 within the chamber 206. The cartridge seal remains in a fixed position relative to the chamber 206 (e.g., at an open end to facilitate manufacturability).

The drive turbine 210 includes the rotary array of drive teeth arranged in the gear pattern. The arranged gear pattern of the rotary array of drive teeth of the power shunt 600 is configured to provide a first range of rotary output power to the drive shaft in response to the first range of shear rates of the STF in the chamber resulting from a first range of rotary power from the load device that causes the decreasing viscosity.

The arranged gear pattern of the rotary array of drive teeth of the power shunt 600 is further configured to provide a second range of rotary output power to the drive shaft in response to the second range of shear rates of the STF in the chamber resulting from a second range of rotary power from the load device that causes the increasing viscosity. The second range of rotary output power is greater than the first range of rotary output power. The operation of the power shunt 600 to provide braking power is further discussed with reference to FIG. 9B.

The load turbine 212 includes the rotary array of load teeth arranged in the gear pattern. The arranged gear pattern of the rotary array of load teeth of the power shunt 600 is configured to provide the decreasing viscosity in response to the first range of shear rates of the STF in the chamber in response to a first range of rotary power from the load device. The arranged gear pattern of the rotary array of load teeth of the power shunt 600 is further configured to provide the increasing viscosity in response to the second range of shear rates of the STF in the chamber in response to a second range of rotary power from the load device. The operation of the power shunt 600 to provide braking power is further discussed with reference to FIG. 9B.

Figure 9B:
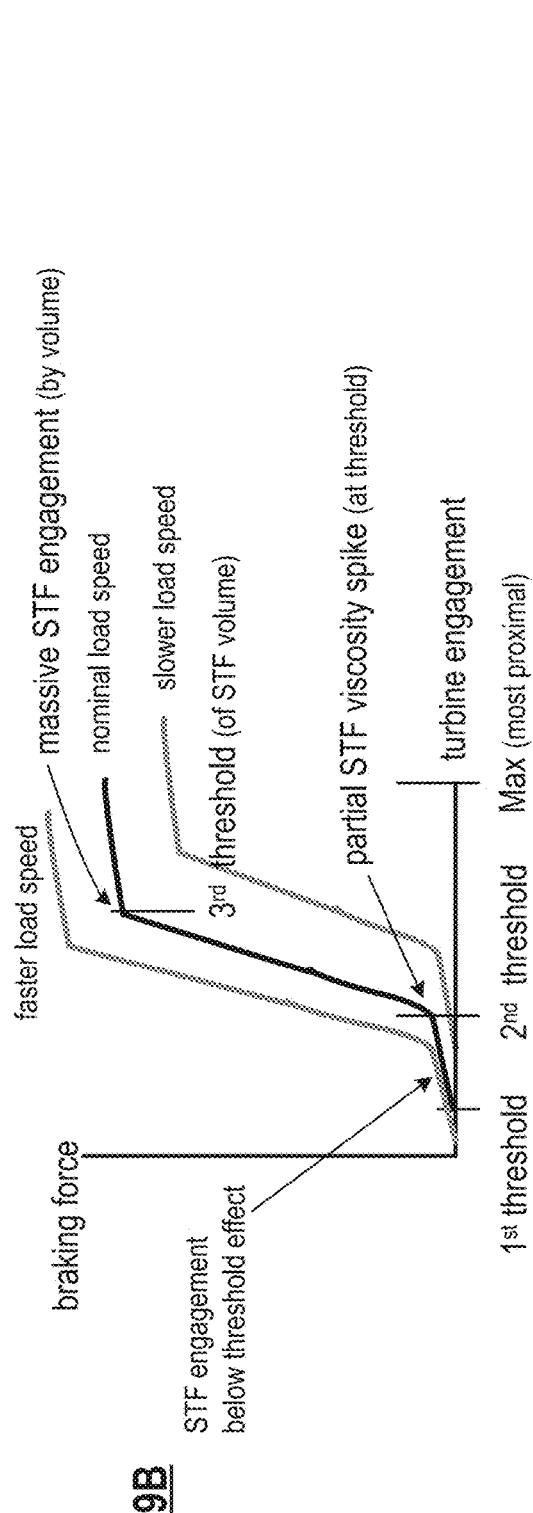
FIG. 9B is a graph portraying an embodiment of operation of another rotary power shunt in accordance with the present invention.

FIG. 9B is a graph portraying an embodiment of operation of a rotary power shunt illustrating turbine engagement versus braking force. The turbine engagement indicates proximity of the turbines, where a maximum level of turbine engagement means that the turbines are right next to each other with substantially no gap. No engagement means that the turbines are separated so much from a setting of the shaft collar 256 that there is virtually no transfer of power via the STF between the turbines.

In an example of operation where a load speed of the load device 504 is a nominal level, STF engagement at a low and below threshold effect level starts as the turbine engagement is increased utilizing shaft collar 256. Minimal braking force is achieved. Further braking force rapidly increases once the STF reaches the second threshold and the second viscosity range where the load turbine transfers more power to the drive turbine for shunting. At the closest turbine engagement set by shaft collar 256, a massive STF engagement occurs where having already achieved the second range of viscosity, simply more volume of the STF is compressed and available to provide drive from the load turbine to the drive turbine to provide more braking force.

When the load speed is slower than the nominal load speed, the turbine engagement must be higher to achieve similar braking forces as illustrated by the gray line to the right. When the load speed is faster than the nominal load speed, the turbine engagement can be lowered to achieve similar braking forces as illustrated by the gray line to the left.

The power shunt 600 may be utilized as a governor of sorts by selecting a turbine engagement level to provide constant braking power to the load device 504 whenever it is above the threshold of the STF as it moves from the first range of viscosities to the second range of viscosities. The governor can be adjusted by moving the shaft collar 256 to achieve a desired level of engagement of the governor.

Figure 10A:
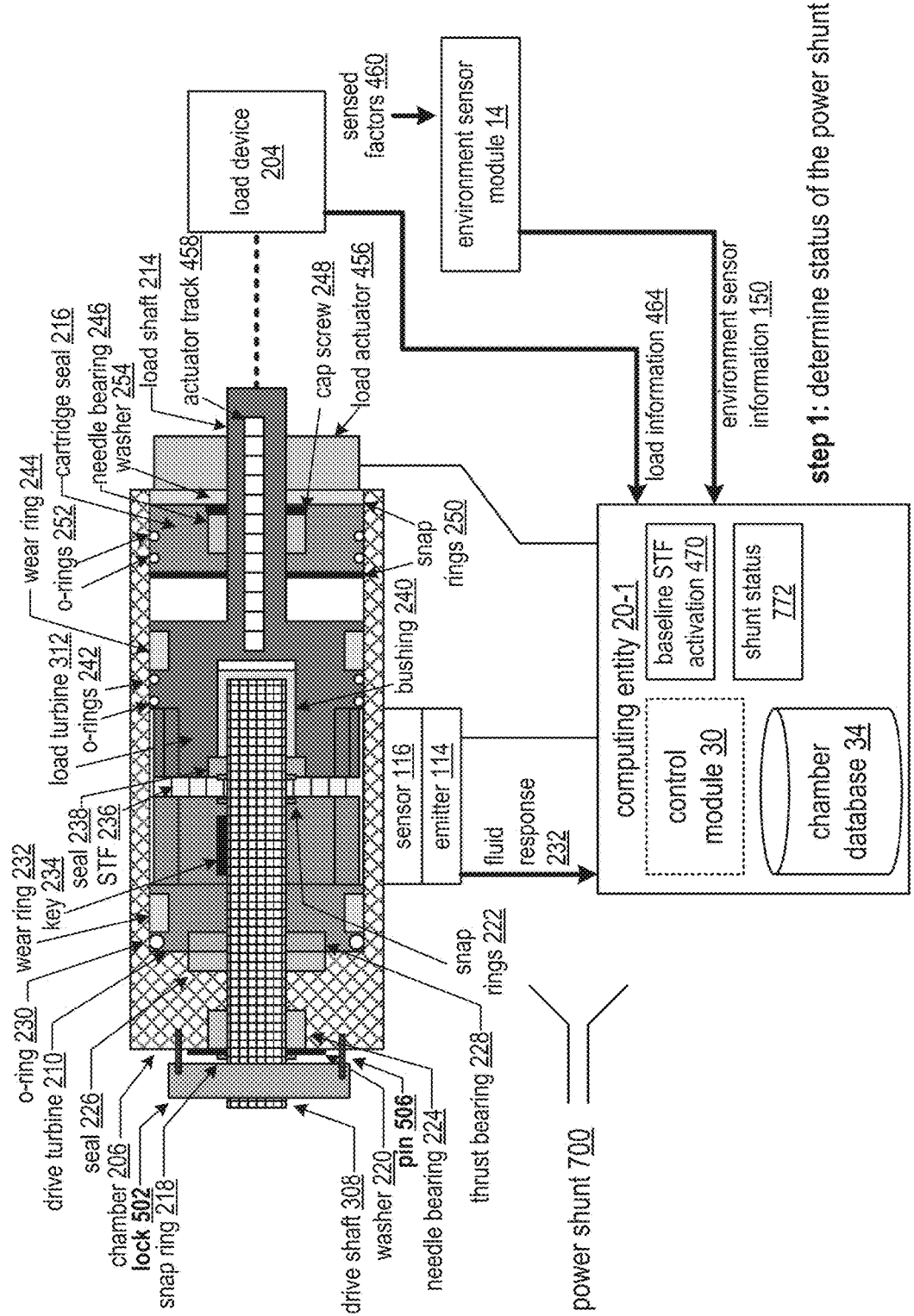
FIGS. 10A-10B are cross-section diagrams of an embodiment of another rotary power shunt illustrating an example of controlling shunting of rotary power in accordance with the present invention.
Figure 10B:
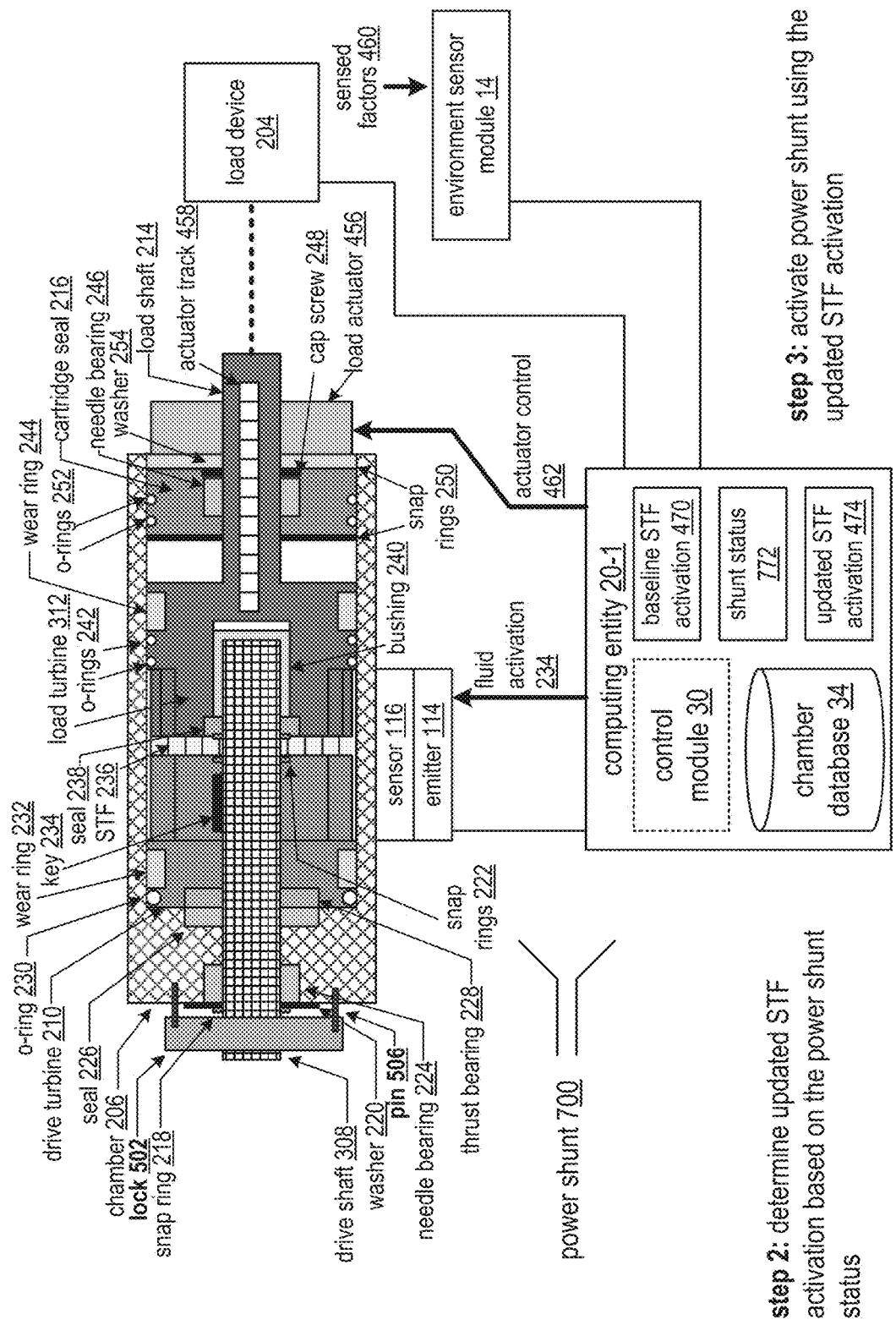

FIGS. 10A-10B are cross-section diagrams of an embodiment of another rotary power shunt 700 illustrating an example of controlling shunting of rotary power. The power shunt 700 includes all the components of the power coupler 400 along with the lock 502 and the pins 506. The power shunt 700 shunts rotational power from a load device 504 providing an automation of braking action as desired. The load device 504 includes any type of device powered by and/or using rotary motion such as a vehicle, a wheel, an elevator, a conveyor system, an automatic door, etc.

The STF 236 is configured to have a decreasing viscosity in response to a first range of shear rates and an increasing viscosity in response to a second range of shear rates, wherein the second range of shear rates are greater than the first range of shear rates as discussed with reference to FIG. 1B. The STF 236 includes a plurality of nanoparticles that includes one or more of an oxide, calcium carbonate, synthetically occurring minerals, naturally occurring minerals, polymers, SiO2, polystyrene, polymethylmethacrylate, or a mixture of any of the above. The STF 236 further includes a solution to suspend the nanoparticles where the solution includes one or more of ethylene glycol, polyethylene glycol, ethanol, silicon oils, phenyltrimethicone, or a mixture of any of the above.

The chamber 206 is configured to contain a portion of the STF 236, where the chamber includes a cylindrical interior channel. The cylindrical interior channel includes a drive side section and a load side section.

The drive shaft 208 is housed at least partially radially within the drive side section and protruding outward from a drive side section end of the chamber for coupling to lock 502 configured to prevent rotation of the driveshaft 208. The load shaft 214 is housed at least partially radially within the load side section and protruding outward from a load side section end of the chamber for coupling to the load device 204.

The drive turbine 210 is housed at least partially radially within the drive side section and coupled to the drive shaft 208. The drive turbine 210 is configured to exert resistive pressure against the shear thickening fluid in response to rotary movement of the load shaft from a rotary force applied to the load shaft from the load device.

The load turbine 212 is housed at least partially radially within the load side section at an adjustable operational distance from the drive turbine and coupled to the load shaft. The load turbine is configured to apply at least some of the rotary power from the load device via the load shaft to the STF. The STF, in response to the pressure exerted against the STF from the load turbine, exerts pressure on the drive turbine. The adjustable operational distance between the drive turbine and the load turbine enables both the first range of shear rates and the second range of shear rates.

The load actuator 456 is configured to establish the adjustable operational distance from the drive turbine to the load turbine. For example, a motor of the load actuator 456 moves the actuator track 458 to push or pull the load shaft 214 within the chamber 206.

The cartridge seal 216 guides the load shaft 214 into the chamber 206. The cartridge seal facilitates containment of the STF 236 within the chamber 206. The cartridge seal remains in a fixed position relative to the chamber 206 (e.g., at an open end to facilitate manufacturability).

FIG. 10A illustrates an example method of operation of the shunting of the power where a first step includes the computing entity 20-1 determining a shunt status 772 of the power shunt 700. The determining of the status of the power shunt includes one or more of interpreting the fluid response 232 from the sensor 116, interpreting load information 464 from the load device 204, and interpreting environment sensor information 150 from the environment sensor module 14 with regards to sensed factors 460. For example, the control module 30 determines a speed of an object associated with the load device 204 from the load information 464. The determining of the status further includes recovering the baseline STF activation 470 from the chamber database 34.

FIG. 10B illustrates a second step of the example method of operation of the shunting of the power where the computing entity 20-1 determines an updated STF activation or 74 based on the power shunt status 772. For example, the control module 30 determines to increase the STF viscosity when braking power is less than desired or when an object associated with the load device 204 is moving too fast. As another example, the control module 30 determines to decrease viscosity when the braking power is greater than desired or when the object associated with the load device is moving too slow. The updated STF activation includes one or more of an updated fluid activation 234 to directly adjust the viscosity of the STF by way of the emitter 114 and an updated actuator control 462 to adjust the separation of the turbines to change the viscosity range.

Having determined the updated STF activation 474, a third step of the example method of operation includes the computing entity 20-1 activating the power shunt 700 using the updated STF activation 474. For example, the control module 30 outputs the fluid activation 234 to the emitter 114 for an updated shear force versus viscosity to add or reduce braking power. As another example, the control module 30 outputs the actuator control 462 to power the load actuator 456 to move the load shaft 214 for an adjusted separation of the turbines. For instance, the turbines are moved closer to increase the braking power and are moved further apart to lower the braking power to coast or speed up on its own.

Figure 10C:
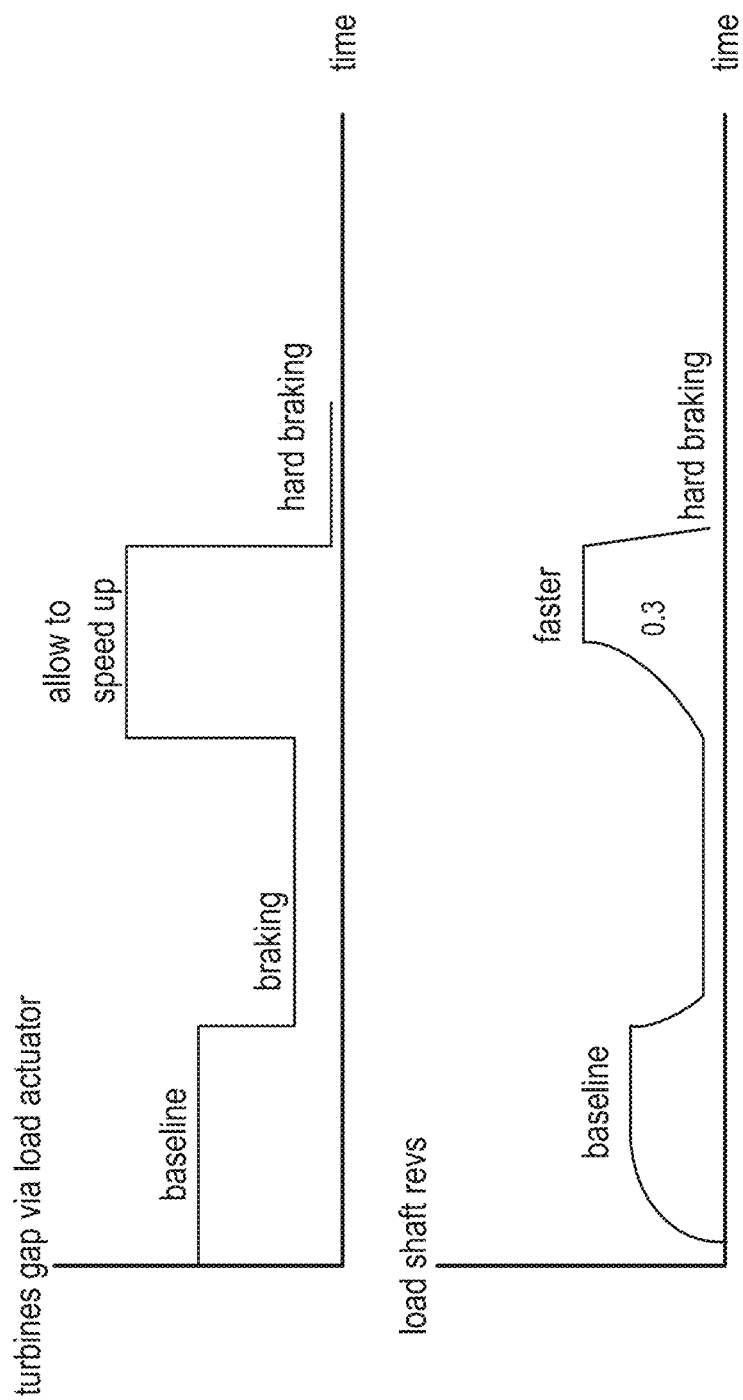
FIG. 10C is a timing diagram set portraying an embodiment of operation of another rotary power shunt in accordance with the present invention.

FIG. 10C is a timing diagram set portraying an embodiment of operation of the rotary power shunt 700 where a baseline separation of the turbines provides a baseline load shaft speed. When a closer gap between the turbines is produced the load shaft revolutions is reduced. When the gap between the turbines is increased beyond the baseline the load shaft revolutions speeds up faster than the baseline speed. When the gap between the turbines is significantly reduced the load shaft experiences hard braking.

The method described above in conjunction with a processing module of any computing entity of the mechanical and computing system of FIG. 10A can alternatively be performed by other modules of the system of FIG. 10A or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system, cause one or more computing devices of the mechanical and computing system of FIG. 10A to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A power shunt for shunting rotary power from a load device, the power shunt comprising:
   a shear thickening fluid (STF), wherein the STF is configured to have a decreasing viscosity in response to a first range of shear rates and an increasing viscosity in response to a second range of shear rates, wherein the second range of shear rates are greater than the first range of shear rates;
   a chamber, the chamber configured to contain a portion of the STF, wherein the chamber includes a cylindrical interior channel, wherein the cylindrical interior channel includes a drive side section and a load side section;
   a drive shaft, the drive shaft housed at least partially radially within the drive side section and protruding outward from a drive side section end of the chamber for coupling to a lock configured to prevent rotation of the drive shaft;
   a load shaft, the load shaft housed at least partially radially within the load side section and protruding outward from a load side section end of the chamber for coupling to the load device;
   a drive turbine, the drive turbine housed at least partially radially within the drive side section and coupled to the drive shaft, the drive turbine configured to exert resistive pressure against the shear thickening fluid in response to rotary movement of the load shaft from a rotary force applied to the load shaft from the load device, wherein the drive turbine includes a rotary array of drive teeth arranged in a gear pattern of the drive teeth; and
   a load turbine, the load turbine housed at least partially radially within the load side section at a fixed operational distance from the drive turbine and coupled to the load shaft, the load turbine configured to apply at least some of the rotary power from the load device via the load shaft to the STF, wherein the STF, in response to pressure exerted against the shear thickening fluid from the load turbine, exerts pressure on the drive turbine, wherein the fixed operational distance between the drive turbine and the load turbine enables both the first range of shear rates and the second range of shear rates, wherein the load turbine includes a rotary array of load teeth arranged in a gear pattern of the load teeth, wherein the gear pattern of the load teeth complements the gear pattern of the drive teeth such that the pressure exerted against the shear thickening fluid from the rotary array of load teeth causes the rotary array of drive teeth to apply a secondary rotary force to the drive shaft such that revolutions per unit of time of the load shaft are greater than revolutions per the unit of time of the drive shaft.

2. The power shunt of claim 1 further comprises:
   a cartridge seal to guide the load shaft into the chamber, wherein the cartridge seal facilitates containment of the STF within the chamber, wherein the cartridge seal remains in a fixed position relative to the chamber; and
   a retaining device to maintain the load shaft in a fixed position within the cartridge seal to establish the fixed operational distance between the drive turbine and the load turbine.

3. The power shunt of claim 1, wherein the STF comprises:
   a plurality of nanoparticles, wherein the plurality of nanoparticles includes one or more of an oxide, calcium carbonate, synthetically occurring minerals, naturally occurring minerals, polymers, SiO2, polystyrene, polymethylmethacrylate, or a mixture thereof.

4. The power shunt coupler of claim 1, wherein the STF further comprises:
   one or more of ethylene glycol, polyethylene glycol, ethanol, silicon oils, phenyltrimethicone, or a mixture thereof.

5. The power shunt of claim 1, wherein the rotary array of drive teeth further comprises:
   the arranged gear pattern of the rotary array of drive teeth configured to provide:
      a first range of rotary output power to the drive shaft in response to the first range of shear rates of the STF in the chamber resulting from a first range of rotary power from the load device that causes the decreasing viscosity, and
      a second range of rotary output power to the drive shaft in response to the second range of shear rates of the STF in the chamber resulting from a second range of rotary power from the load device that causes the increasing viscosity, wherein the second range of rotary output power is greater than the first range of rotary output power.

6. The power shunt of claim 1, wherein the rotary array of load teeth further comprises:
   the arranged gear pattern of the rotary array of load teeth configured to provide:
      the decreasing viscosity in response to the first range of shear rates of the STF in the chamber in response to a first range of rotary power from the load device causing first level revolutions per the unit of time of the load shaft to be greater than the revolutions per the unit of time of the drive shaft, and
      the increasing viscosity in response to the second range of shear rates of the STF in the chamber in response to a second range of rotary power from the load device, wherein the second range of rotary power is greater than the first range of rotary power causing second revolutions per the unit of time of the load shaft to be greater than the revolutions per the unit of time of the drive shaft such that the second revolutions per the unit of time of the load shaft is less than the first revolutions per the unit of time of the load shaft.

* * * * *